United States Patent
Xu et al.

(10) Patent No.: US 11,523,308 B2
(45) Date of Patent: Dec. 6, 2022

(54) METHODS, APPARATUSES, AND SYSTEMS FOR VOICE SERVICE HANDOVER

(71) Applicant: Huawei Technologies Co., Ltd., Shenzhen (CN)

(72) Inventors: Xiaoying Xu, Shanghai (CN); Xing Liu, Shenzhen (CN); Jing Chen, Shanghai (CN); Qinghai Zeng, Shanghai (CN); Yang Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/038,207

(22) Filed: Sep. 30, 2020

(65) Prior Publication Data

US 2021/0045018 A1     Feb. 11, 2021

Related U.S. Application Data

(63) Continuation of application No. PCT/CN2019/080964, filed on Apr. 2, 2019.

(30) Foreign Application Priority Data

Apr. 4, 2018 (CN) .......................... 201810301411.2

(51) Int. Cl.
     *H04W 36/00*      (2009.01)
     *H04W 12/041*      (2021.01)
     (Continued)

(52) U.S. Cl.
     CPC ..... *H04W 36/0022* (2013.01); *H04W 12/041* (2021.01); *H04W 12/08* (2013.01); *H04W 36/0038* (2013.01); *H04W 36/14* (2013.01)

(58) Field of Classification Search
     CPC ........... H04W 36/0022; H04W 12/041; H04W 12/08; H04W 36/0038; H04W 36/14; H04W 12/04
     (Continued)

(56) References Cited

U.S. PATENT DOCUMENTS

2013/0315203 A1* 11/2013 Wong ................ H04W 36/0022
                                                                                 370/331
2019/0182718 A1* 6/2019 Shan ....................... H04W 8/06
2020/0322857 A1* 10/2020 Park ....................... H04W 76/34

FOREIGN PATENT DOCUMENTS

CN          105657703 A      6/2016
JP          2015513289 A      4/2015
(Continued)

OTHER PUBLICATIONS

"Potential Implementations of voice service continuity from 5G to 2/3G" 3GPP TSG-SA WG1 Meeting #80 S1-174157 Reno, USA Nov. 25-Dec. 1, 2017 (Year: 2017).*

(Continued)

*Primary Examiner* — Michael Y Mapa
(74) *Attorney, Agent, or Firm* — Slater Matsil, LLP

(57) ABSTRACT

A communication method and a communications apparatus, the method including receiving, by an access and mobility management function (AMF) entity, a first message from a first access network device, where the first message comprises information for indicating to hand over a voice service of a terminal from a packet switched (PS) domain to a circuit switched (CS) domain, the first message further comprises identification information of a target device, and the target device is a second access network device in a 3G network, and sending, by the AMF entity, through a mobility management entity (MME) a request message to a mobile switching center (MSC) entity, where the request message comprises information indicating a source of the first message.

19 Claims, 9 Drawing Sheets

(51) Int. Cl.
*H04W 12/08* (2021.01)
*H04W 36/14* (2009.01)
*H04W 12/04* (2021.01)

(58) Field of Classification Search
USPC .................................. 370/331; 455/436–449
See application file for complete search history.

(56) References Cited

FOREIGN PATENT DOCUMENTS

| | | |
|---|---|---|
| JP | 2015529433 A | 10/2015 |
| JP | 2017528058 A | 9/2017 |
| WO | 2010077007 A2 | 7/2010 |
| WO | 2015196366 A1 | 12/2015 |
| WO | 2016134536 A1 | 9/2016 |

OTHER PUBLICATIONS

3GPP TSG-SA WG1 Meeting #80 S1-174157 Reno, USA Nov. 25-Dec. 1, 2017 Title: "Potential Implementations of voice service continuity from 5G to 2/3G" (Year: 2017).*

China Unicom, Hua Wei, "Potential implementations of voice service continuity from 5G to 2/3G;" 3GPP TSG-SA WG1 Meeting #80, Reno, USA, Nov. 25, 2017-Dec. 1, 2017, S1-174157, 6 pages.

Huawei; Hisilicon, "A proposal for the key derivation during SRVCC from 5G to 3G without direct interface between AMF and MSC server of TR 33.856;" 3GPP TSG SA WG3 (Security) Meeting #91, Apr. 16-20, 2018, Belgrade, S3-181203, 3 pages.

"3rd Generation Partnership Project; Technical Specification Group Services and System Aspects; Study on security aspects of single radio voice continuity from 5G to UTRAN (Release 15)," 3GPP TR 33.856 V1.1.0 (Sep. 2018),15 pages.

"3rd Generation Partnership Project; Technical Specification Group Radio Access Network; UTRAN Iu interface Radio Access Network Application Part (RANAP) signalling (Release 14)", 3GPP TS 25.413, V14.1.0, Technical Specification, Jun. 2017, 445 Pages.

"3rd Generation Partnership Project; Technical Specification Group Services and System Aspects; Single Radio Voice Call Continuity (SRVCC); Stage 2 (Release 15)", 3GPP TS 23.216, V15.1.0, Technical Specification, Dec. 2017, 69 Pages.

"3rd Generation Partnership Project; Technical Specification Group Services and System Aspects; Security architecture and procedures for 5G system (Release 15)", 3GPP TS 33.501, V15.0.0, Technical Specification, Mar. 2018, 128 Pages.

"3rd Generation Partnership Project; Technical Specification Group Services and System Aspects; 3GPP System Architecture Evolution (SAE); Security architecture (Release 15)", 3GPP TS 33.401, V15. 3.0, Technical Specification, Mar. 2018, 163 Pages.

* cited by examiner

METHODS, APPARATUSES, AND SYSTEMS FOR VOICE SERVICE HANDOVER

CROSS-REFERENCE TO RELATED APPLICATIONS

This application is a continuation of International Application No. PCT/CN2019/080964, filed on Apr. 2, 2019, which claims priority to Chinese Patent Application No. 201810301411.2, filed on Apr. 4, 2018. The disclosures of the aforementioned applications are hereby incorporated by reference in their entireties.

TECHNICAL FIELD

This application relates to the communications field, and in particular, to a communication method and a communications apparatus.

BACKGROUND

In different communications networks, voice services have different bearing mechanisms. Specifically, in a network using a 2nd generation (2G) mobile communications technology or a 3rd generation (3G) mobile communications technology, a voice service is a session service carried in a circuit switched (CS) domain. With development of network technologies, some networks that provide a packet switched (PS) domain, for example, a long term evolution (LTE) network, also support the voice service.

Single radio voice call continuity (SRVCC) is a solution for implementing voice service continuity in the long term evolution (LTE) network. To avoid a problem that the voice service is interrupted after a terminal performing the voice service moves out of coverage of the LTE network, the SRVCC solution may be used to hand over the voice service from the packet switched (PS) domain to the circuit switched (CS) domain, ensuring that the voice service is not interrupted.

In a next-generation communications network, for example, in a 5th generation (5G) mobile communications technology, a voice over IP multimedia subsystem (VoIMS) technology is supported. To avoid voice service interruption after the terminal performing the voice service moves out of coverage of the 5G network, in other words, to support continuity of the voice service, the voice service needs to be handed over from the 5G network to the CS domain of the 2G/3G network.

How to hand over the voice service from the 5G network to the CS domain of the 2G/3G network to ensure continuity of the voice service in the 5G network becomes a technical problem that urgently needs to be resolved.

SUMMARY

This application provides a communication method and a communications apparatus, so that a voice service of a terminal is handed over from a bearer in a PS domain to a bearer in a CS domain, to ensure continuity of the voice service in a 5G network, and improve user experience.

According to a first aspect, a communication method is provided. The method includes receiving, by an access and mobility management function (AMF) entity, a first message from an access network device, where the first message includes information for indicating to hand over a voice service of a terminal from a packet switched (PS) domain to a circuit switched (CS) domain, the first message further includes identification information of a target device, and the target device is an access network device in a 3G network and/or a 4G network, and deriving, by the AMF entity, key information of a network in which the target device is located.

In the technical solution of this embodiment of this application, the AMF entity determines, based on an identifier of the target device in the first message, the network to which the voice service is to be handed over, to derive the key information of the network in which the target device is located, ensuring that the voice service is handed over from a bearer in the PS domain to the network in which the target device is located, ensuring continuity of the voice service, and improving user experience.

With reference to the first aspect, in some implementations of the first aspect, the target device is an access network device in the 3G network, and the deriving, by the AMF entity, key information of a network in which the target device is located includes determining, by the AMF entity, key derivation parameters of the 3G network, and deriving, by the AMF entity, the key information of the 3G network based on the key derivation parameters of the 3G network and a root key of a network in which the AMF entity is located.

With reference to the first aspect, in some implementations of the first aspect, the deriving, by the AMF entity, the key information of the 3G network based on the key derivation parameters of the 3G network and a root key of a network in which the AMF entity is located includes deriving, by the AMF entity, the key information of the 3G network based on a first function code (FC), a first downlink non-access stratum count, and the root key of the network in which the AMF entity is located, deriving, by the AMF entity, the key information of the 3G network based on a first FC, a preset value, and the root key of the network in which the AMF entity is located, or deriving, by the AMF entity, the key information of the 3G network based on a first FC, a random number, and the root key of the network in which the AMF entity is located.

In the technical solution of this embodiment of this application, a key derivation manner is provided. To be specific, the AMF entity determines, based on an identifier of the access network device in the 3G network, the key derivation parameters for deriving the key information of the 3G network, and derives the key information of the 3G network based on the root key of a 5G network and the key derivation parameters of the 3G network.

With reference to the first aspect, in some implementations of the first aspect, the target device is an access network device in the 3G network, and the deriving, by the AMF entity, key information of a network in which the target device is located includes determining, by the AMF entity, key derivation parameters of the 4G network, deriving, by the AMF entity, key information of the 4G network based on the key derivation parameters of the 4G network and a root key of a network in which the AMF entity is located, and deriving, by the AMF entity, the key information of the 3G network based on the key information of the 4G network.

With reference to the first aspect, in some implementations of the first aspect, the target device is an access network device in the 4G network, and the deriving, by the AMF entity, key information of a network in which the target device is located includes determining, by the AMF entity, key derivation parameters of the 4G network, and deriving, by the AMF entity, the key information of the 4G network based on the key derivation parameters of the 4G network and a root key of a network in which the AMF entity is located.

With reference to the first aspect, in some implementations of the first aspect, the deriving, by the AMF entity, the key information of the 4G network based on the key derivation parameters of the 4G network and a root key of a network in which the AMF entity is located includes deriving, by the AMF entity, the key information of the 4G network based on a first FC, a second downlink non-access stratum count, and the root key of the network in which the AMF entity is located, deriving, by the AMF entity, the key information of the 4G network based on a second FC, a second downlink non-access stratum count, and the root key of the network in which the AMF entity is located, deriving, by the AMF entity, the key information of the 4G network based on a second FC, a preset value, and the root key of the network in which the AMF entity is located, or deriving, by the AMF entity, the key information of the 4G network based on a second FC, a random number, and the root key of the network in which the AMF entity is located.

In the technical solution of this embodiment of this application, a key derivation manner is provided. To be specific, the AMF entity determines, based on an identifier of the access network device in the 4G network, the key derivation parameters for deriving the key information of the 4G network, and derives the key information of the 4G network based on the root key of a 5G network and the key derivation parameters of the 4G network.

With reference to the first aspect, in some implementations of the first aspect, the deriving, by the AMF entity, the key information of the 3G network based on the key information of the 4G network includes deriving, by the AMF entity, the key information of the 3G network based on the key information of the 4G network, a first FC, and a second downlink non-access stratum count, deriving, by the AMF entity, the key information of the 3G network based on the key information of the 4G network, a second FC, and a second downlink non-access stratum count, deriving, by the AMF entity, the key information of the 3G network based on the key information of the 4G network, a second FC, and a preset value, or deriving, by the AMF entity, the key information of the 3G network based on the key information of the 4G network, a second FC, and a random number.

In the technical solution of this embodiment of this application, a key derivation manner is provided. To be specific, the AMF entity derives the key information of the 3G network based on an identifier of the access network device in the 3G network, the derived key information of the 4G network, and the key derivation parameters of the 3G network. With reference to the first aspect, in some implementations of the first aspect, the deriving, by the AMF entity, the key information of the 3G network based on the key information of the 4G network includes deriving, by the AMF entity, the key information of the 3G network based on the key information of the 4G network, a third FC, and a second downlink non-access stratum count, deriving, by the AMF entity, the key information of the 3G network based on the key information of the 4G network, a third FC, and a preset value, or deriving, by the AMF entity, the key information of the 3G network based on the key information of the 4G network, a third FC, and a random number.

It should be noted that the key derivation parameters used to derive the key information of the 3G network based on the key information of the 4G network may be the same as the key derivation parameters used to derive the key information of the 4G network or the 3G network based on a key of a 5G network, or may be different from the key derivation parameters used to derive the key information of the 4G network or the 3G network based on a key of a 5G network. The key derivation parameters include parameters such as the first FC, the second FC, the third FC, the first downlink non-access stratum value, the second downlink non-access stratum value, the preset value, and the random number.

It should be noted that, in the implementations of this application, the key derivation parameters used to derive the key information are not limited to the key derivation parameters of the 4G network or the 3G network in this application. Alternatively, key derivation may be performed based on another parameter in combination with the key derivation parameters in this application. Alternatively, key derivation may be performed based on some of the key derivation parameters that are used to derive the 4G network or the 3G network and that are proposed in this application.

With reference to the first aspect, in some implementations of the first aspect, the root key of the network in which the AMF entity is located is any one of $K_{AMF}$, $K_{SEAF}$, $K_{AUSF}$, and a cipher key CK+an integrity key IK.

With reference to the first aspect, in some implementations of the first aspect, the communication method further includes sending, by the AMF entity, the key information of the 3G network to a mobility management entity (MME), sending, by the AMF entity, the key information of the 3G network and the key information of the 4G network to a mobility management entity (MME), or sending, by the AMF entity, the key information of the 4G network to a mobility management entity (MME).

It should be noted that in the embodiments of this application, the MME entity may serve as a network device for forwarding a message between the AMF entity and a mobile switching center (MSC) entity. For example, the AMF entity sends the key information to the MSC entity via the MME entity, or the AMF entity sends a handover request message via the MME entity.

In some possible implementations, a manner in which the AMF entity derives the key information of the network in which the target device is located and sends the key information to the MSC entity in the 3G network includes but is not limited to any one of the following manners.

Manner 1:

When the terminal supports handover of the voice service from the 5G network to the 3G network, and there is an interface between the AMF entity and the mobile switching center MSC entity, the AMF entity derives the key information of the 3G network or uses the CK and the IK of the terminal in the 5G network as the key information of the 3G network, and directly sends the key information of the 3G network to the MSC entity.

Manner 2:

When the terminal supports handover of the voice service from the 5G network to the 3G network, and there is no interface between the AMF entity and the MSC entity, the AMF entity derives the key information of the 3G network, and forwards the derived key information of the 3G network to the MSC entity via the MME entity.

Manner 3:

When the terminal does not support handover of the voice service from the 5G network to the 3G network, the AMF entity derives the key information of the 4G network, and sends the key information of the 4G network to the MME entity, the MME entity derives the key information of the 3G network based on the key information of the 4G network, or extracts the key information of the 3G network from the key information of the 4G network, and sends the derived key information of the 3G network to the MSC entity.

Manner 4:

When the terminal does not support handover of the voice service from the 5G network to the 3G network, the AMF entity derives the key information of the 3G network and the key information of the 4G network, and sends the key information of the 3G network and the key information of the 4G network to the MME entity, after completing handover of a non-voice service or some or all of non-GBR (guaranteed bit rate) bearers from the 5G network to the 4G network, the MME entity sends the key information of the 3G network derived by the AMF entity to the MSC entity.

With reference to the first aspect, in some implementations of the first aspect, the communication method further includes receiving, by the AMF entity, a second message from a mobile switching center MSC entity, where the second message includes information indicating that handover of the voice service from the PS domain to the CS domain is complete, and determining, by the AMF entity based on the second message, to suspend or release a PDN session of a non-voice service or of a non-GBR bearer.

With reference to the first aspect, in some implementations of the first aspect, the communication method further includes sending, by the AMF entity, configuration information to the terminal, where the configuration information includes information indicating a network to which the terminal preferentially falls back when a call of the voice service ends in the CS domain.

Optionally, this application provides an implementation of key derivation, and this implementation is applicable to all scenarios of this application.

The AMF entity first derives the key information of the 4G network, then derives the key information of the 3G network based on the key information of the 4G network, and sends the derived key information of the 3G network to the MME entity or the MSC entity.

An input parameter for deriving a 4G key based on root key of the 5G network includes at least one of the following parameters: the first FC, the second FC, the first downlink non-access stratum count, the second downlink non-access stratum count, a second preset value, a first preset value, a first random number, or a second random number. The 4G key may be $K_{ASME}$.

An input parameter for deriving a 3G key based on the derived key information of the 4G network includes at least one of the following parameters: the first FC, the second FC, the third FC, the first downlink non-access stratum count, the second downlink non-access stratum count, a third downlink non-access stratum count, a third preset value, the second preset value, the first preset value, the first random number, the second random number, or a third random number.

For example, the first FC, the first downlink non-access stratum count, the first random number, or the first preset value may be used by the AMF entity to derive the key information of the 3G network based on the root key of the 5G network.

For example, the second FC, the second downlink non-access stratum count, the second random number, or the second preset value may be used by the AMF entity to derive the key information of the 4G network based on the root key of the 5G network.

For example, the third FC, the third downlink non-access stratum count, the third random number, or the third preset value may be used by the AMF entity to derive the key information of the 3G network based on a root key of the 4G network.

Optionally, the 4G network is used to forward the handover request message generated by the AMF entity.

In an optional implementation, the message includes an information field for indicating to hand over the voice service of the terminal from the packet switched (PS) domain to the circuit switched (CS) domain, and the information filed is a transparent container for the MME entity. The key information of the 3G network is carried in this field. In this case, the message is a request message that is sent by reusing the AMF entity and for handing over the voice service to the 4G system, and a source is added to the message to carry the information. In this implementation, the MME entity is slightly affected, and requires only identification and forwarding.

In an optional implementation, the AMF entity and the MME entity define a message, which is used to send a message generated by the AMF entity. The message is used to request handover of the voice service of the terminal from the packet switched (PS) domain to the circuit switched (CS) domain. In this implementation, a new message needs to be defined, and the request message sent by the AMF entity for handover to the 4G network is not affected.

After receiving the message or the information, the MME entity forwards the message or the information to a default or pre-configured anchor MSC device, or an anchor MSC device indicated in the message.

According to a second aspect, a communication method is provided. The communication method includes receiving a third message, and if the third message includes information for indicating to hand over a voice service from a packet switched (PS) domain to a circuit switched (CS) domain, determining, based on the third message, to suspend or release a PDN session of a non-voice service, or if the third message includes information for indicating to hand over a non-voice service or some non-GBR bearers to a 4G network, determining, based on the third message, to suspend a bearer of a voice service or suspend a bearer with quality of service (QoS) class identifier (QCI)=1 or a GBR bearer, and determining to derive key information of a network in which a target device is located, where the target device is an access network device in a 3G network and/or a 4G network.

In the technical solution of this embodiment of this application, the terminal processes the voice service or the non-voice service of the terminal based on the received third message, and hands over the voice service from a bearer in the PS domain to a bearer in the CS domain, to ensure continuity of the voice service and improve user experience.

With reference to the second aspect, in some implementations of the second aspect, the third message further includes key derivation parameters, and the key derivation parameters are determined by an access and mobility management function AMF entity.

With reference to the second aspect, in some implementations of the second aspect, the communication method further includes deriving the key information of the 3G network based on the key derivation parameters of the 3G network and a root key, or deriving the key information of the 4G network based on the key derivation parameters of the 4G network and a root key.

With reference to the second aspect, in some implementations of the second aspect, the deriving the key information of the 3G network based on the key derivation parameters of the 3G network and a root key includes deriving the key information of the 3G network based on a first FC, a first downlink non-access stratum count, and the root key, deriving the key information of the 3G network based on a first FC, a preset value, and the root key, or deriving the key information of the 3G network based on a first FC, a random number, and the root key.

In the technical solution of this embodiment of this application, a key derivation manner is provided. To be specific, the AMF entity determines, based on an identifier of the access network device in the 3G network, the key derivation parameters for deriving the key information of the 3G network, and derives the key information of the 3G network based on the root key of a 5G network and the key derivation parameters of the 3G network.

With reference to the second aspect, in some implementations of the second aspect, the deriving the key information of the 4G network based on the key derivation parameters of the 4G network and a root key includes deriving the key information of the 4G network based on a first FC, a second downlink non-access stratum count, and the root key, deriving the key information of the 4G network based on a second FC, a second downlink non-access stratum count, and the root key, deriving the key information of the 4G network based on a second FC, a preset value, and the root key, or deriving the key information of the 4G network based on a second FC, a random number, and the root key.

In the technical solution of this embodiment of this application, a key derivation manner is provided. To be specific, the AMF entity determines, based on an identifier of the access network device in the 4G network, the key derivation parameters for deriving the key information of the 4G network, and derives the key information of the 4G network based on the root key of a 5G network and the key derivation parameters of the 4G network.

It should be noted that the preset value for deriving a key of the 3G network is the same as or different from the preset value for deriving a key of 4G. The random number for deriving the key of the 3G network is the same as or different from the random number for deriving the key of 4G.

With reference to the second aspect, in some implementations of the second aspect, the root key is any one of $K_{AMF}$, $K_{SEAF}$, $K_{AUSF}$, and a cipher key CK+an integrity key IK.

With reference to the second aspect, in some implementations of the second aspect, the communication method further includes deriving the key information of the 3G network based on the key information of the 4G network.

With reference to the second aspect, in some implementations of the second aspect, the deriving the key information of the 3G network based on the key information of the 4G network includes deriving the key information of the 3G network based on the key information of the 4G network, a first FC, and a second downlink non-access stratum count, deriving the key information of the 3G network based on the key information of the 4G network, a second FC, and a second downlink non-access stratum count, deriving the key information of the 3G network based on the key information of the 4G network, a second FC, and a preset value, or deriving the key information of the 3G network based on the key information of the 4G network, a second FC, and a random number.

With reference to the second aspect, in some implementations of the second aspect, the deriving, by the AMF entity, the key information of the 3G network based on the key information of the 4G network includes deriving, by the AMF entity, the key information of the 3G network based on the key information of the 4G network, a third FC, and a second downlink non-access stratum count, deriving, by the AMF entity, the key information of the 3G network based on the key information of the 4G network, a third FC, and a second downlink non-access stratum count, deriving, by the AMF entity, the key information of the 3G network based on the key information of the 4G network, a third FC, and a preset value, or deriving, by the AMF entity, the key information of the 3G network based on the key information of the 4G network, a third FC, and a random number.

In the technical solution of this embodiment of this application, a key derivation manner is provided. To be specific, the AMF entity derives the key information of the 3G network based on an identifier of the access network device in the 3G network, the derived key information of the 4G network, and the key derivation parameters of the 3G network.

It should be noted that the key derivation parameters used to derive the key information of the 3G network based on the key information of the 4G network may be the same as the key derivation parameters used to derive the key information of the 3G network, or may be different from the key derivation parameters used to derive the key information of the 3G network. The key derivation parameters include parameters such as the first FC, the second FC, the third FC, the first downlink non-access stratum count, the second downlink non-access stratum count, the preset value, and the random number.

It should be noted that, in the implementations of this application, the key derivation parameters used to derive the key information are not limited to the key derivation parameters of the 4G network or the 3G network in this application. Alternatively, key derivation may be performed based on another parameter in combination with the derivation parameters in this application. Alternatively, key derivation may be performed based on some of the key derivation parameters that are used to derive the 4G network or the 3G network and that are proposed in this application.

With reference to the second aspect, in some implementations of the second aspect, the communication method further includes receiving configuration information from the AMF entity, where the configuration information includes information indicating a network to which the terminal preferentially falls back when a call of the voice service ends in the CS domain.

According to a third aspect, a communication method is provided. The communication method includes generating, by an access network device, a third message, and if the third message includes information for indicating to hand over the voice service from the PS domain to a CS domain, indicating a terminal to suspend or release a PDN session of a non-voice service, or if the third message includes information for indicating to hand over a non-voice service from the PS domain to a 4G network, indicating a terminal to suspend a bearer of a voice service or suspend a bearer with QCI=1, and sending, by the access network device, the third message to the terminal.

In the technical solution of this embodiment of this application, the access network device generates the third message, and sends the third message to the terminal. The terminal indicates, according to the indication information included in the third message, to suspend the voice service or the non-voice service, to ensure that the voice service is handed over from a bearer in the PS domain to a bearer in the CS domain, ensure continuity of the voice service, and improve user experience.

With reference to the third aspect, in some implementations of the third aspect, the third message includes key derivation parameters of a network in which the target device is located, and the key derivation parameters are determined by an AMF entity.

According to a fourth aspect, a communication method is provided. The communication method includes receiving, by an access and mobility management function AMF entity, a second message sent by a mobile switching center MSC entity, where the second message is used to indicate that handover of a voice service of a terminal from a packet switched (PS) domain to a circuit switched (CS) domain is complete, and determining, by the AMF entity based on the second message, to suspend or release a PDN session of a non-voice service or of a non-GBR bearer.

With reference to the fourth aspect, in some implementations of the fourth aspect, the communication method further includes deriving, by the AMF entity, key information of a CS domain network, where the key information includes a cipher key, an integrity protection key, or a cipher key and an integrity protection key.

With reference to the fourth aspect, in some implementations of the fourth aspect, the deriving, by the AMF entity, key information of a CS domain network includes determining, by the AMF entity, key derivation parameters, and deriving, by the AMF entity, the key information of the CS domain network based on the key derivation parameters and a root key, where the root key includes any one of $K_{AMF}$, $K_{SEAF}$, $K_{AUSF}$, and the cipher key CK+the integrity key IK.

With reference to the fourth aspect, in some implementations of the fourth aspect, the communication method further includes sending, by the AMF entity, configuration information to the terminal, where the configuration information includes information indicating a network to which the terminal preferentially falls back when a call of the voice service ends in the CS domain.

According to a fifth aspect, a communications apparatus is provided. The apparatus includes a module, component, or circuit configured to implement the communication method according to any one of the first aspect or the possible implementations of the first aspect.

According to a sixth aspect, a communications apparatus is provided. The apparatus includes a module, component, or circuit configured to implement the communication method according to any one of the second aspect or the possible implementations of the second aspect.

According to a seventh aspect, a communications apparatus is provided. The apparatus includes a module, component, or circuit configured to implement the communication method according to any one of the third aspect or the possible implementations of the third aspect.

According to an eighth aspect, a communications apparatus is provided. The apparatus includes a processor and a transceiver, configured to perform the communication method according to any one of the first aspect to the fourth aspect or the possible implementations of the first aspect to the fourth aspect.

According to a ninth aspect, a chip is provided. The chip includes a processor and a transceiver, configured to perform the communication method according to any one of the first aspect to the fourth aspect or the possible implementations of the first aspect to the fourth aspect.

According to a tenth aspect, a computer-readable storage medium is provided. The computer-readable storage medium includes an instruction. When the instruction is run on a communications apparatus, the communications apparatus is enabled to implement the communication method according to any one of the first aspect to the fourth aspect or the possible implementations of the first aspect to the fourth aspect.

According to an eleventh aspect, a computer program is provided. When the computer program is run on a communications apparatus, the communications apparatus is enabled to implement the communication method according to any one of the first aspect to the fourth aspect or the possible implementations of the first aspect to the fourth aspect.

DETAILED DESCRIPTION OF ILLUSTRATIVE EMBODIMENTS

Figure 1:
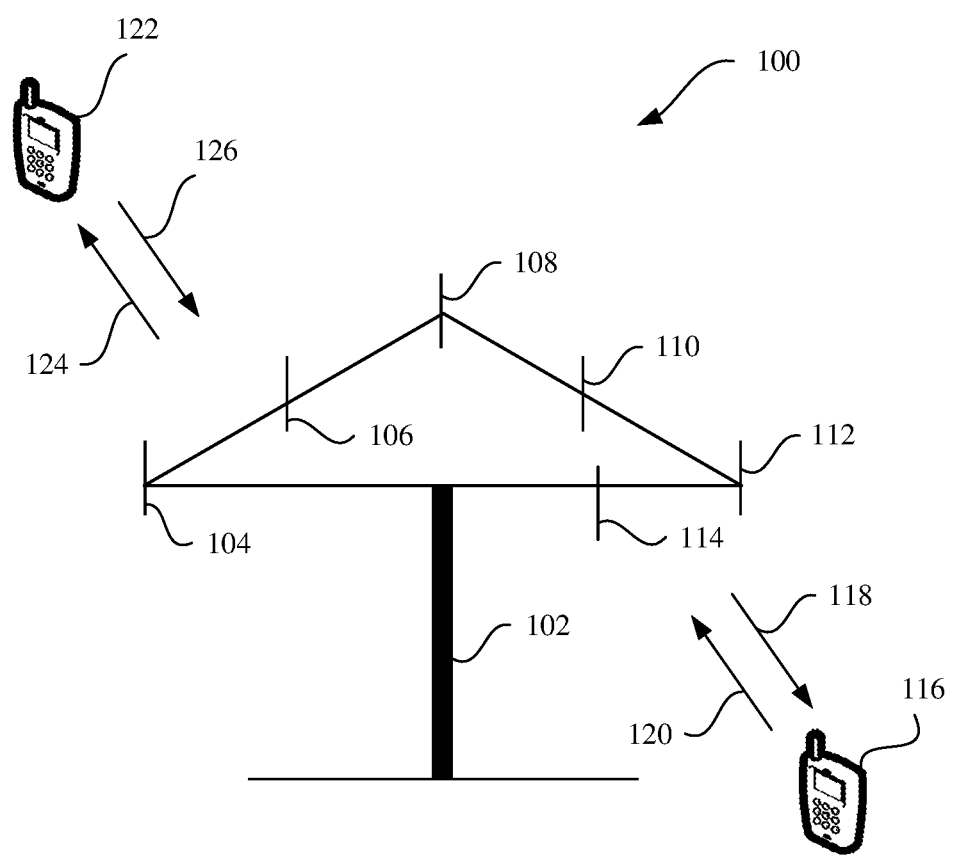
FIG. 1 is a schematic diagram of a communications system that can be applied in an embodiment of this application.

The following describes the technical solutions of this application with reference to the accompanying drawings.

The terms such as "component", "module", and "system" used in this application are used to indicate computer-related entities, hardware, firmware, combinations of hardware and software, software, or software being executed. For example, the component may be, but is not limited to, a process that runs on a processor, a processor, an object, an executable file, an execution thread, a program, and/or a computer. As shown in the figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. For example, the components may communicate by performing a local and/or remote process and based on, for example, a signal having one or more data packets (for example, data from two components interacting with another component in a local system, a distributed system, and/or across a network such as an internet interacting with another system by using the signal).

It should be understood that division of manners, cases, types, and embodiments in embodiments of this application are merely for ease of description, but should not constitute any special limitation, and features in various manners, types, cases, and embodiments may be combined when there is no contradiction.

It should be further understood that in the embodiments of this application, "first", "second", "third", and the like are merely intended to indicate different objects, and do not indicate other limitations on the indicated objects.

The technical solutions of the embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, an evolved packet system (EPS), a future 5th generation (5G) system, or a new radio (NR) system.

A terminal apparatus in the embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal apparatus may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal apparatus in a 5G network, or a terminal apparatus in a future evolved public land mobile network (PLMN). This is not limited in the embodiments of this application.

A base station in the embodiments this application may be a device configured to communicate with a terminal apparatus. The base station may be a base transceiver station (base transceiver station, BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario, or the like. This is not limited in the embodiments of this application.

Network elements in the embodiments of this application may include network devices in a 5G system architecture and/or in a 4G system architecture. For example, the network elements may include an access and mobility management function (AMF) entity, a mobility management entity (MME), a mobile switching center (MSC) entity, a session management function (SMF) entity, a unified data management (UDM) entity, a policy control function (PCF) entity, a policy and charging rules function (PCRF) entity, a packet data network (PDN), a packet data unit (PDU), a control plane gateway (PDN gateway-control plane, PGW-C), a user plane gateway (PDN gateway-user plane, PGW-U), a home subscriber server (HSS), an application function (AF) entity, and the like.

Figure 2:
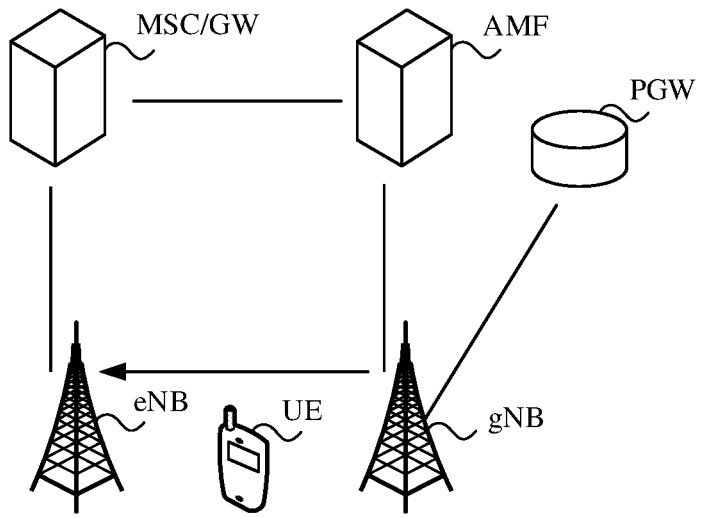
FIG. 2 is a schematic diagram of an application scenario of a communication method according to an embodiment of this application.
Figure 3:
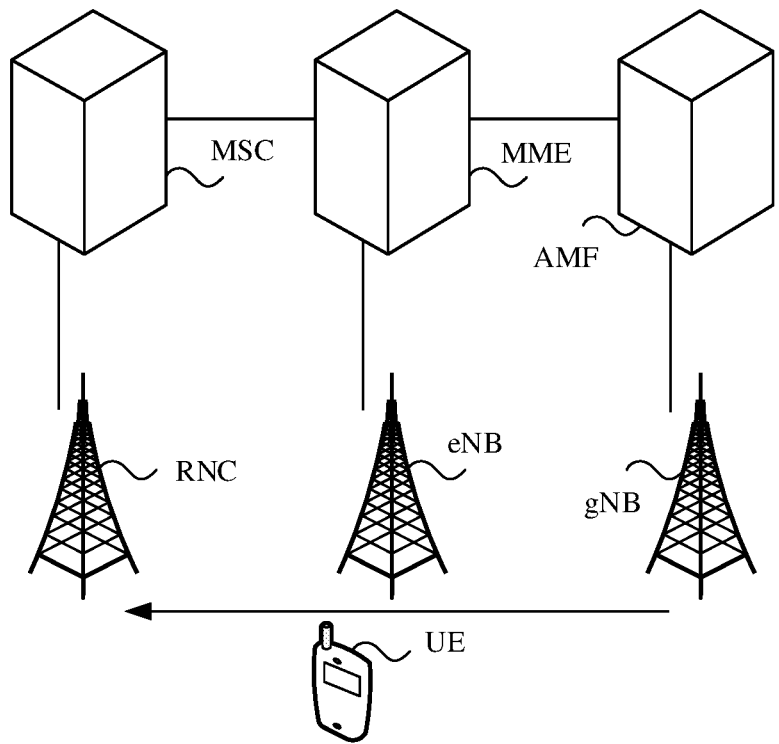
FIG. 3 is a schematic diagram of an application scenario of a communication method according to another embodiment of this application.

The following describes an application environment of the embodiments of this application with reference to FIG. 1 to FIG. 3. FIG. 1 to FIG. 3 are respectively schematic diagrams of possible system architectures 100 to 300 in the embodiments of this application. FIG. 1 shows a communications system 100 applied in an embodiment of this application. FIG. 2 is a communication architecture diagram of handover of a voice service in a 5G system when there is a direct interface between an AMF entity and a mobile switching center (MSC) entity in a 3G network. FIG. 3 is a communication architecture diagram of handover of a voice service in a 5G system when there is no direct interface between an AMF entity and an MSC entity.

FIG. 1 shows the communications system 100 applied in the embodiment of this application. The communications system 100 may include at least one terminal no, an access network device 120, and a core network device 130. In some possible designs, a plurality of terminals no may be grouped based on a service feature. The access network device 120 may be a device that communicates with the terminal no, for example, a base station or a base station controller. The core network device 130 has functions of providing a connection for a terminal, managing a terminal, and bearing a service, and serves as a bearer network to provide an interface for an external network.

FIG. 2 is a communication architecture diagram of handover of a voice service in a 5G system when there is a direct interface between an AMF entity and an MSC entity. The AMF entity is configured to provide access and mobility management of a user, mainly including registration management, reachability management, mobility management, paging management, access authentication and authorization, encryption and integrity protection on non-access stratum signaling, and the like of the user.

As shown in FIG. 2, there is a direct interface between the AMF entity and the MSC entity. If a terminal supports SRVCC, when the terminal performs a voice service in the fifth generation communications system, the voice service may be directly handed over from the 5G network to a 3G network after the terminal moves out of coverage of the 5G network, to ensure continuity of the voice service.

FIG. 3 is a communication architecture diagram of handover of a voice service in a 5G system when there is no direct interface between an AMF entity and an MSC entity.

As shown in FIG. 3, there is no direct interface between the AMF entity and the MSC entity. If a terminal supports SRVCC, when the terminal performs a voice service in a fifth generation communications system, the voice service needs to be forwarded via an MME entity after the terminal moves out of coverage of the 5G network, so that the voice service is handed over to a 3G network.

The MME entity is used for mobility management of a user. For example, the mobility management of the user mainly includes attach management, reachability management, mobility management, paging management, access authentication and authorization, encryption and integrity protection on non-access stratum signaling, and the like of the user.

Alternatively, if the terminal in a 5G NR network does not support SRVCC to a CS domain of a 3G network, when the terminal performs a voice service in a fifth generation communications system, the voice service of the 5G network needs to be first handed over to an LTE network and then the voice service is handed over from the LTE network to the 3G network after the terminal moves out of coverage of the 5G network. In other words, the MME entity forwards the voice service during voice service handover, so that the voice service is handed over from the 5G network to the 3G network, to ensure continuity of the voice service.

In the embodiments of this application, based on different architectures between the AMF entity in the 5G system and the MSC entity in the 3G system, a communication method is proposed. According to the communication method, a voice service may be handed over between the 5G system and the 3G system based on a network requirement, to ensure continuity of the voice service, and improve user experience.

Based on the foregoing scenario descriptions, this application provides an implementation of deriving key information, which is applicable to all the foregoing scenarios of this application. The key information is used to perform encryption, or integrity protection, or encryption and integrity protection on the CS domain of the 3G network.

In the embodiments of this application, the AMF entity may first derive key information of a 4G network, then derive key information of the 3G network based on the key information of the 4G network, and send the derived key information of the 3G network to the MME entity or the MSC entity.

It may be understood that, in the embodiments of this application, deriving a key or key derivation means obtaining a key based on an input parameter.

An input parameter for deriving the key information of the 4G network based on root key of the 5G network includes at least one of the following parameters: a first FC, a second FC, a first downlink non-access stratum count, a second downlink non-access stratum count, a second preset value, a first preset value, a first random number, or a second random number. The key information of the 4G network may be $K_{ASME}$, or may be key information derived based on CK||IK.

It should be noted that, in the embodiments of this application, a function code (FC) may be understood as an input parameter used based on a different function when the key information is derived.

The first FC may be function code used when the key information of the 3G network is derived based on the root key of the 5G network, the second FC may be function code used when the key information of the 4G network is derived based on the root key of the 5G network, and the third FC may be function code used when the key information of the 3G network is derived based on a root key of the 4G network. A non-access stratum count includes a sequence number and an overflow counter, and the non-access stratum count may be an uplink non-access stratum count or a downlink non-access stratum count. In the embodiments of this application, a derivation parameter may be a downlink non-access stratum count, or may be an uplink non-access stratum count. The first downlink non-access stratum count may be a downlink non-access stratum count used when the key information of the 3G network is derived based on the root key of the 5G network, and the second downlink non-access stratum count may be a downlink non-access stratum count used when the key information of the 4G network is derived based on the root key of the 5G network. $K_{ASME}$ is key information generated after the terminal and the network complete authentication.

An input parameter for deriving a key of the 3G network based on the derived key information of the 4G network includes at least one of the following parameters: the first FC, the second FC, the third FC, the first downlink non-access stratum count, the second downlink non-access stratum count, a third downlink non-access stratum count, a third preset value, the second preset value, the first preset value, the first random number, the second random number, or a third random number.

For example, the first FC, the first downlink non-access stratum count, the first random number, or the first preset value may be used by the AMF entity to derive the key information of the 3G network based on the root key of the 5G network.

For example, the second FC, the second downlink non-access stratum count, the second random number, or the second preset value may be used by the AMF entity to derive the key information of the 4G network based on the root key of the 5G network.

For example, the third FC, the third downlink non-access stratum count, the third random number, or the third preset value may be used by the AMF entity to derive the key information of the 3G network based on the root key of the 4G network.

It should be noted that, in the implementations of this application, the key derivation parameters used to derive the key information are not limited to the key derivation parameters of the 4G network or the 3G network in this application. Alternatively, key derivation may be performed based on another parameter in combination with the derivation parameters in this application. Alternatively, key derivation may be performed based on some of the key derivation parameters that are used to derive the 4G network or the 3G network and that are proposed in this application.

Optionally, the 4G network is used to forward the handover request message generated by the AMF entity.

In an optional implementation, the message includes an information field for indicating to hand over the voice service of the terminal from the packet switched (PS) domain to the circuit switched (CS) domain, and the information filed is a transparent container for the MME entity. The key information of the 3G network is carried in this field. In this case, the message is a request message that is sent by reusing the AMF entity and for handing over the voice service to the 4G system, and a source is added to the message to carry the information. In this implementation, the MME entity is slightly affected, and requires only identification and forwarding.

In an optional implementation, the AMF entity and the MME entity define a message, which is used to send a message generated by the AMF entity. The message is used to request handover of the voice service of the terminal from the packet switched (PS) domain to the circuit switched (CS) domain. In this implementation, a new message needs to be defined, and the request message sent by the AMF entity for handover to the 4G network is not affected.

After receiving the message or the information, the MME entity forwards the message or the information to a default or pre-configured anchor MSC device, or an anchor MSC device indicated in the message.

Figure 4:
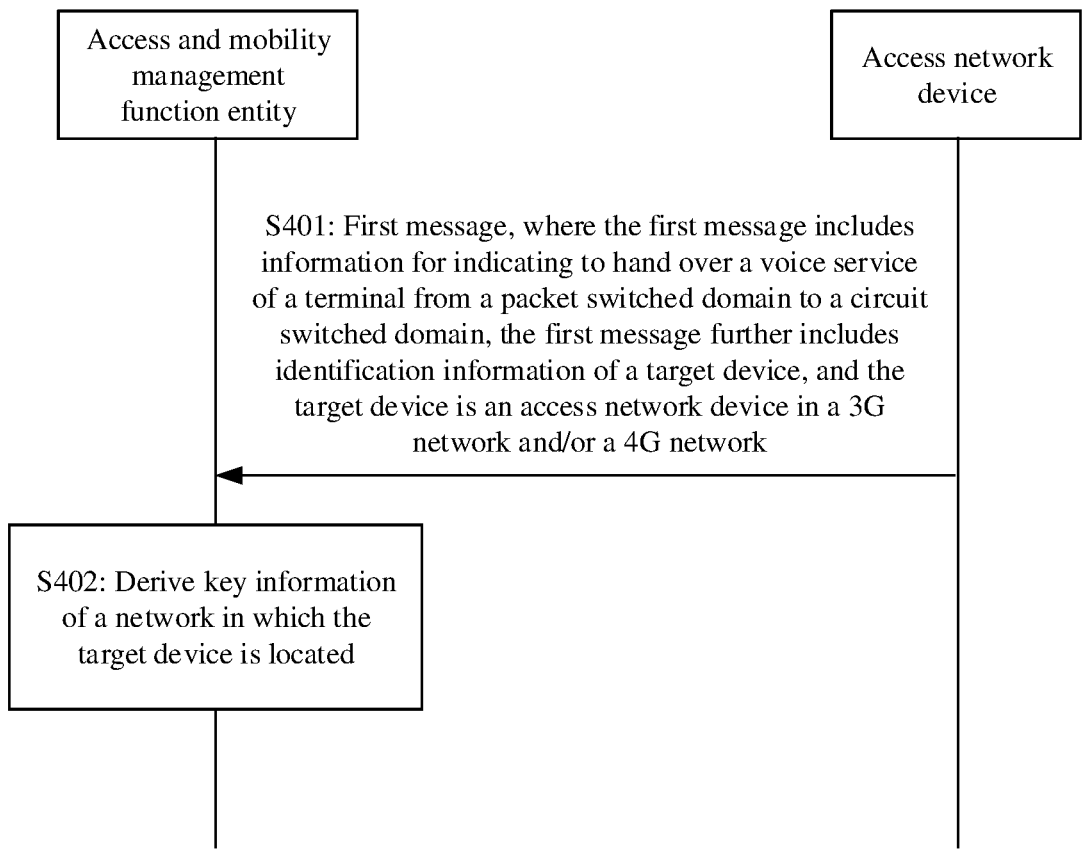
FIG. 4 is a schematic interaction diagram of a communication method according to an embodiment of this application.

A communication method in an embodiment of this application is described below with reference to FIG. 4. The method 400 in FIG. 4 may be applied to any architecture in FIG. 1 to FIG. 3. Alternatively, the method in FIG. 4 may also be applied to another similar architecture. An access and mobility management function AMF entity may be a core network device in a 5G network or a core network device in another network. The access network device may be a base station in the 5G network, for example, a gNB. This is not limited in the embodiments of this application. The method 400 includes the following steps.

Step 401: The access and mobility management function AMF entity receives a first message from an access network device, where the first message includes information for indicating to hand over a voice service of a terminal from a packet switched (PS) domain to a circuit switched (CS) domain, the first message further includes identification information of a target device, and the target device is an access network device in a 3G network and/or a 4G network.

In some examples, the first message may include identification information of the 3G network. Alternatively, the first message may include identification information of the 4G network. Alternatively, the first message includes identification information of the 3G network and identification information of the 4G network.

Before step 401, the access network device sends the first message to the AMF entity based on a factor such as a measurement report reported by the terminal or load of the access network device. The first message is used to request the access network device to hand over a voice service of a 5G system from the PS domain to a CS domain of a 3G/2G system.

Step 402: The AMF entity derives key information of a network in which the target device is located.

In this embodiment of this application, the key information includes key information of the 3G network and key information of the 4G network. A manner in which the AMF entity derives the key information of the network in which the target device is located and sends the key information to an MSC entity in the 3G network includes but is not limited to any one of the following manners.

Manner 1:

When the terminal supports handover of the voice service from the 5G network to the 3G network, and there is an interface between the AMF entity and the mobile switching center MSC entity, the AMF entity derives the key information of the 3G network or uses a CK and an IK of the terminal in the 5G network as the key information of the 3G network, and directly sends the key information of the 3G network to the MSC entity.

Manner 2:

When the terminal supports handover of the voice service from the 5G network to the 3G network, and there is no interface between the AMF entity and the MSC entity, the AMF entity derives the key information of the 3G network, and forwards the derived key information of the 3G network to the MSC entity via an MME entity.

Manner 3:

When the terminal does not support handover of the voice service from the 5G network to the 3G network, the AMF entity derives the key information of the 4G network, and sends the key information of the 4G network to an MME entity, the MME entity derives the key information of the 3G network based on the key information of the 4G network, or extracts the key information of the 3G network from the key information of the 4G network, and sends the derived key information of the 3G network to the MSC entity.

Manner 4:

When the terminal does not support handover of the voice service from the 5G network to the 3G network, the AMF entity derives the key information of the 3G network and the key information of the 4G network, and sends the key information of the 3G network and the key information of the 4G network to the MME entity, after completing handover of a non-voice service or some or all of non-GBR (guaranteed bit rate) bearers from the 5G network to the 4G network, the MME entity sends the key information of the 3G network derived by the AMF entity to the MSC entity.

In this embodiment of this application, a manner in which the AMF entity determines key derivation parameters of the 3G network and derives the key information of the 3G network based on the key derivation parameters of the 3G network and a root key of a network in which the AMF entity is located includes but is not limited to the following derivation manners.

For example, the AMF entity derives the key information of the 3G network based on a first FC, a first downlink non-access stratum count, and the root key of the network in which the AMF entity is located.

For example, the AMF entity derives the key information of the 3G network based on a first FC, a preset value, and the root key of the network in which the AMF entity is located.

It should be understood that the preset value may be a preset value that is configured in advance and maintained by both the terminal and the AMF entity.

For example, the AMF entity derives the key information of the 3G network based on a first FC, a random number, and the root key of the network in which the AMF entity is located.

It should be understood that the random number may be a parameter known to the AMF entity, and the AMF entity sends the parameter to the terminal.

In this embodiment of this application, the root key of the network in which the AMF entity is located may be any one of $K_{AMF}$, $K_{SEAF}$, $K_{AUSF}$, and a cipher key CK+an integrity key IK.

In this embodiment of this application, a manner in which the AMF entity determines key derivation parameters of the 4G network and derives the key information of the 4G network based on the key derivation parameters of the 4G network and a root key of a network in which the AMF entity is located includes but is not limited to the following derivation manners.

For example, the AMF entity derives the key information of the 4G network based on a first FC, a second downlink non-access stratum count, and the root key of the network in which the AMF entity is located.

For example, the AMF entity derives the key information of the 4G network based on a second FC, a second downlink non-access stratum count, and the root key of the network in which the AMF entity is located.

For example, the AMF entity derives the key information of the 4G network based on a second FC, a preset value, and the root key of the network in which the AMF entity is located.

For example, the AMF entity derives the key information of the 4G network based on a second FC, a random number, and the root key of the network in which the AMF entity is located.

It should be noted that in this embodiment of this application, the preset value for deriving a key of the 3G network is the same as or different from the preset value for deriving a key of 4G. The random number for deriving the key of the 3G network is the same as or different from the random number for deriving the 4G parameter. This is not limited in this application.

In this embodiment of this application, the root key of the network in which the AMF entity is located may be any one of $K_{AMF}$, $K_{SEAF}$, $K_{AUSF}$, and a cipher key CK+an integrity key IK.

In this embodiment of this application, a manner in which the AMF entity derives the key information of the 3G network based on the key information of the 4G network includes but is not limited to the following derivation manners.

For example, the AMF entity derives the key information of the 3G network based on the key information of the 4G network, a first FC, and a second downlink non-access stratum count.

For example, the AMF entity derives the key information of the 3G network based on the key information of the 4G network, a second FC, and a second downlink non-access stratum count.

For example, the AMF entity derives the key information of the 3G network based on the key information of the 4G network, a second FC, and a preset value.

For example, the AMF entity derives the key information of the 3G network based on the key information of the 4G network, a second FC, and a random number.

In this embodiment of this application, that the AMF entity derives the key information of the 3G network based on the key information of the 4G network includes the AMF entity derives the key information of the 3G network based on the key information of the 4G network, a third FC, and a second downlink non-access stratum count, the AMF entity derives the key information of the 3G network based on the key information of the 4G network, a third FC, and a preset value, or the AMF entity derives the key information of the 3G network based on the key information of the 4G network, a third FC, and a random number.

It should be noted that the key derivation parameters used to derive the key information of the 3G network based on the key information of the 4G network may be the same as the key derivation parameters used to derive the key information of the 3G network, or may be different from the key derivation parameters used to derive the key information of the 3G network. The key derivation parameters include parameters such as the first FC, the second FC, the third FC, the first downlink non-access stratum value, the second downlink non-access stratum value, the preset value, and the random number.

It should be noted that, in the implementations of this application, the key derivation parameters used to derive the key information are not limited to the key derivation parameters of the 4G network or the 3G network in this application. Alternatively, key derivation may be performed based on another parameter in combination with the derivation parameters in this application. Alternatively, key derivation may be performed based on some of the key derivation parameters that are used to derive the 4G network or the 3G network and in this application.

Optionally, after step 402, the method 400 further includes the following steps.

The AMF entity receives a second message from a mobile switching center MSC entity, where the second message includes information indicating that handover of the voice service from the PS domain to the CS domain is complete.

The AMF entity determines, based on the second message, to suspend or release a PDN session of a non-voice service.

Optionally, after the second message is sent, the method 400 further includes the following step.

The AMF entity sends configuration information to the terminal, where the configuration information includes information indicating a network to which the terminal preferentially falls back when a call of the voice service ends in the CS domain.

For example, after the terminal completes handover of the voice service from the PS domain to the CS domain, when the call of the voice service ends in the CS domain, the terminal may fall back to the 4G network or fall back to the 5G network based on the configuration information, to perform the non-voice service.

In this embodiment of this application, the terminal processes the voice service or the non-voice service of the terminal according to a received handover instruction sent by the access network device, and hands over the voice service from a bearer in the PS domain to a bearer in the CS domain, to ensure continuity of the voice service and improve user experience.

Specific examples of the communication method in the embodiments of this application are described below with reference to FIG. 5A to FIG. 6B. The examples include a communication method for handing over a voice service of a terminal from a bearer in a PS domain of a 5G network to a bearer in a CS domain of a 3G network in the following scenarios. The terminal supports handover of the voice service from the 5G network to the 3G network, and there is an interface between an AMF entity and an MSC entity, the terminal supports handover of the voice service from the 5G network to the 3G network, and there is no interface between an AMF entity and an MSC entity, the terminal does not support handover of the voice service from the 5G network to the 3G network. It should be understood that this application is described by using the foregoing three scenarios as examples for description, and this application is not limited thereto.

Figure 5A:
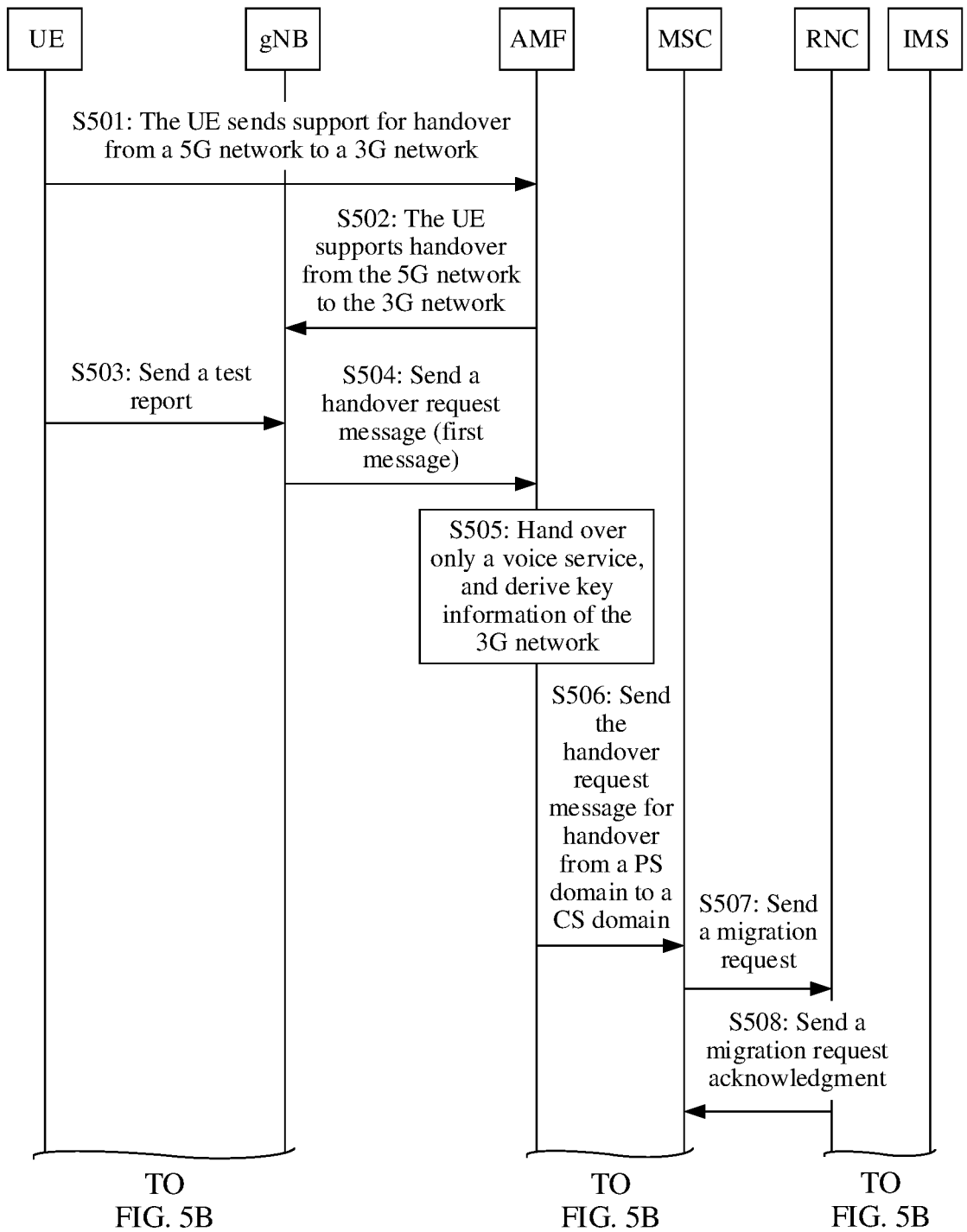
FIG. 5A and FIG. 5B are a schematic interaction diagram of a communication method according to another embodiment of this application.
Figure 5B:
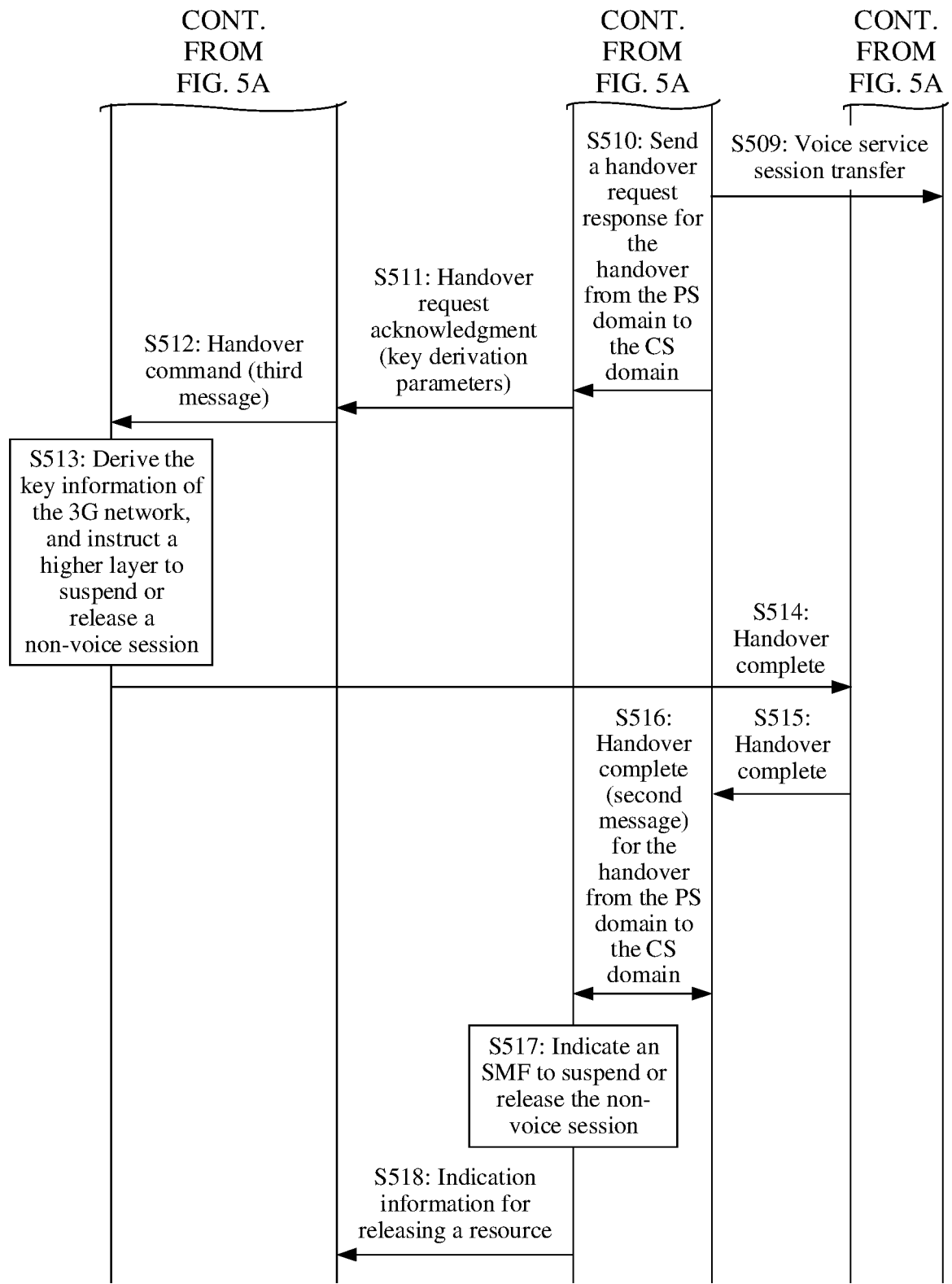

Referring to FIG. 5A and FIG. 5B, a method in FIG. 5A and FIG. 5B may be applied to the architecture 200. The method in FIG. 5A and FIG. 5B includes the following steps.

S501: A terminal reports, to an AMF entity, support for handover of a voice service from a 5G network to a 3G network. In other words, in the 5G network, the terminal supports SRVCC to a bearer in a CS domain of the 3G network.

S502: The AMF entity notifies a gNB that the terminal supports SRVCC to the bearer in the CS domain of the 3G network.

S503: The terminal sends a measurement report to the gNB.

S504: The gNB determines, based on a factor such as the measurement report or current load, to initiate, to the AMF entity, a handover request for handing over the voice service to a CS domain of a 3G network, where the handover request message includes an identifier of a target device to which the voice service is handed over, for example, an identifier of a radio network controller (RNC) entity.

It should be understood that in this embodiment of this application, the handover request message sent by the gNB to the AMF entity may be the first message in the method 400.

S505: The AMF entity determines to hand over the voice service to the bearer in the CS domain of the 3G network, and the AMF entity derives key information of the 3G network, where the key information is used to perform encryption, or integrity protection, or encryption and integrity protection on the CS domain of the 3G network.

Optionally, in an example, the AMF entity derives the key information of the 3G network based on a first FC, a first downlink non-access stratum count, and a root key of a network in which the AMF entity is located.

Optionally, in an example, the AMF entity derives the key information of the 3G network based on a first FC, a preset value, and a root key of a network in which the AMF entity is located.

It should be noted that the preset value may be a preset value that is configured in advance and maintained by both the terminal and the AMF entity.

Optionally, in an example, the AMF entity derives the key information of the 3G network based on a first FC, a random number, and a root key of a network in which the AMF entity is located.

It should be noted that the random number may be a parameter known to the AMF entity, and the AMF entity sends the parameter to the terminal.

In the foregoing examples, the root key of the network in which the AMF entity is located may be any one of $K_{AMF}$, $K_{SEAF}$, $K_{AUSF}$, and a cipher key CK+an integrity key IK.

For example, in an optional derivation manner, the AMF entity derives the key information of the 3G network based on the root key and a derivation parameter. The key information of the 3G network includes the cipher key CK and the integrity key IK. The derivation parameter may be one of the first downlink non-access stratum count, the random number, or the preset value, that is, $K_{AMF} \rightarrow > K_{ASME} \rightarrow > CS$ domain CK IK.

For example, in an optional derivation manner, the AMF entity directly uses the root key CK+IK.

It should be understood that the foregoing examples are provided for description, and do not limit this embodiment of this application.

S506: The AMF entity sends, to an MSC entity in the 3G network, the handover request message for handing over the voice service from a PS domain to the CS domain. The handover request message includes the key information of the 3G network derived by the AMF entity.

S507: The MSC entity in the 3G network sends a migration request message of the voice service to a radio network controller (RNC) of the 3G network, where the migration request message includes the key information of the 3G network derived by the AMF entity.

S508: The RNC sends a migration request acknowledgment message to the MSC entity, where the migration request acknowledgment message includes a radio resource configuration parameter allocated by the RNC to the terminal.

S509: The MSC entity initiates voice session transfer information to an IP multimedia subsystem (IMS) entity, and the IMS entity updates a voice session and a user plane bearer based on the message.

S510: The MSC entity sends, to the AMF entity, a handover request response for handing over the voice service from the PS domain to the CS domain, where the handover request response includes the radio resource configuration parameter that is allocated by the RNC to the terminal and that is received by the MSC entity.

S511: The AMF entity sends a handover request acknowledgment message to the gNB, where the handover request acknowledgment message includes the radio resource configuration parameter allocated by the RNC to the terminal and key derivation parameters that are used to derive the key information of the 3G network and that are determined by the AMF entity.

S512: The gNB sends, to the terminal, a handover instruction for handing over the voice service from the PS domain of the 5G network to the bearer in the CS domain of the 3G network, where the handover instruction includes the key derivation parameters used to derive the key information of the 3G network, and the key derivation parameters are determined by the AMF entity.

S513: The terminal receives the handover instruction including the key derivation parameters, derives the key information of the 3G network based on the key derivation parameters and a root key of the 5G network, and indicates, according to the received handover instruction, an upper layer of the terminal to suspend or release a PDN session of a non-voice service.

It should be noted that in this embodiment of this application, the terminal receives a third message sent by the base station gNB of the 5G network. For example, the terminal receives the handover instruction sent by the base station gNB of the 5G network. When the third message is information for indicating the terminal to hand over the voice service from the packet switched (PS) domain to the circuit switched (CS) domain, the terminal determines, according to the third message, to suspend or release the PDN session of the non-voice service.

It should be understood that in this embodiment of this application, the third message may be the handover instruction sent by the base station, such as the gNB, in the 5G network. Alternatively, the third message may be a handover instruction sent by a base station, such as an eNB, in a 4G network. This is not limited in this embodiment of this application.

S514: The terminal accesses the 3G network, and sends a handover complete message to the RNC. The message indicates that the terminal has completed handover of the voice service from the bearer in the PS domain to the bearer in the CS domain.

S515: The RNC sends the handover complete message to the MSC entity, to notify the MSC entity that the terminal has completed handover of the voice service from the bearer in the PS domain to the bearer in the CS domain.

S516: The MSC entity sends the handover complete message to the AMF entity.

It should be understood that the handover complete message sent by the MSC entity to the AMF entity may be the second message in the method 400.

S517: After receiving the handover complete message sent by the MSC entity, the AMF entity indicates an SMF entity to suspend or release the PDN session of the non-voice service.

Specifically, the AMF entity indicates the SMF entity to suspend or release the PDN session of the non-voice service, and the SMF entity suspends or releases the PDN session of the non-voice service or of a non-GBR bearer via a user port function (UPF) entity. The SMF entity indicates the UPF entity to suspend or release all PDN sessions of the terminal.

Optionally, the AMF entity indicates the SMF entity to suspend or release all PDN sessions of the terminal.

S518: The AMF entity sends, to the base station gNB of the 5G network, indication information for releasing a resource.

It should be noted that the method 500 is the communication method for handing over the voice service of the terminal from the bearer in the PS domain of the 5G network to the bearer in the CS domain of the 3G network when the terminal supports handover of the voice service from the 5G network to the 3G network, and there is an interface between the AMF entity and the MSC entity.

When the terminal supports handover of the voice service from the 5G network to the 3G network, and there is no interface between the AMF entity and the MSC entity, because there is no direct interface between the AMF entity and the MSC entity, the AMF entity needs to perform a transfer operation via an anchor MME entity, to hand over the voice service of the terminal from the bearer in the PS domain of the 5G network to the bearer in the CS domain of the 3G network.

For example, in step S506, when there is no interface between the AMF entity and the MSC entity, the AMF entity sends, to the MME entity, the handover request message for handing over the voice service from the PS domain to the CS domain. The handover request message includes the key information of the 3G network derived by the AMF entity and identification information of the target base station of the voice service, for example, an RNC ID. The MME entity sends the handover request message to the MSC entity.

In this embodiment of this application, the AMF entity may directly derive the key information of the 3G network, and send the derived key information of the 3G network to the MME entity or the MSC entity.

For example, the AMF entity derives the key information of the 3G network based on the first FC, the first downlink non-access stratum count, and the root key of the network in which the AMF entity is located.

Optionally, in an example, the AMF entity derives the key information of the 3G network based on the first FC, the preset value, and the root key of the network in which the AMF entity is located.

It should be noted that the preset value may be a preset value that is configured in advance and maintained by both the terminal and the AMF entity.

Optionally, in an example, the AMF entity derives the key information of the 3G network based on the first FC, the random number, and the root key of the network in which the AMF entity is located.

It should be noted that the random number may be a parameter known to the AMF entity, and the AMF entity sends the parameter to the terminal.

In this embodiment of this application, the AMF entity may first derive key information of a 4G network, then derive key information of the 3G network based on the key information of the 4G network, and send the derived key information of the 3G network to the MME entity or the MSC entity.

An input parameter for deriving the key information of the 4G network based on root key of the 5G network includes at least one of the following parameters: the first FC, a second FC, the first downlink non-access stratum count, a second downlink non-access stratum count, a second preset value, a first preset value, a first random number, or a second random number. The key information of the 4G network may be $K_{ASME}$, or may be key information derived based on CK||IK.

An input parameter for deriving a 3G key based on the derived key information of the 4G network includes at least one of the following parameters: the first FC, the second FC, a third FC, the first downlink non-access stratum count, the second downlink non-access stratum count, a third downlink non-access stratum count, a third preset value, the second preset value, the first preset value, the first random number, the second random number, or a third random number.

For example, the first FC, the first downlink non-access stratum count, the first random number, or the first preset value may be used by the AMF entity to derive the key information of the 3G network based on the root key of the 5G network.

For example, the second FC, the second downlink non-access stratum count, the second random number, or the second preset value may be used by the AMF entity to derive the key information of the 4G network based on the root key of the 5G network.

For example, the third FC, the third downlink non-access stratum count, the third random number, or the third preset value may be used by the AMF entity to derive the key information of the 3G network based on the root key of the 4G network.

It should be noted that, in the implementations of this application, the key derivation parameters used to derive the key information are not limited to the key derivation parameters of the 4G network or the 3G network in this application. Alternatively, key derivation may be performed based on another parameter in combination with the derivation parameters in this application. Alternatively, key derivation may be performed based on some of the key derivation parameters that are used to derive the 4G network or the 3G network and that are proposed in this application.

Figure 6A:
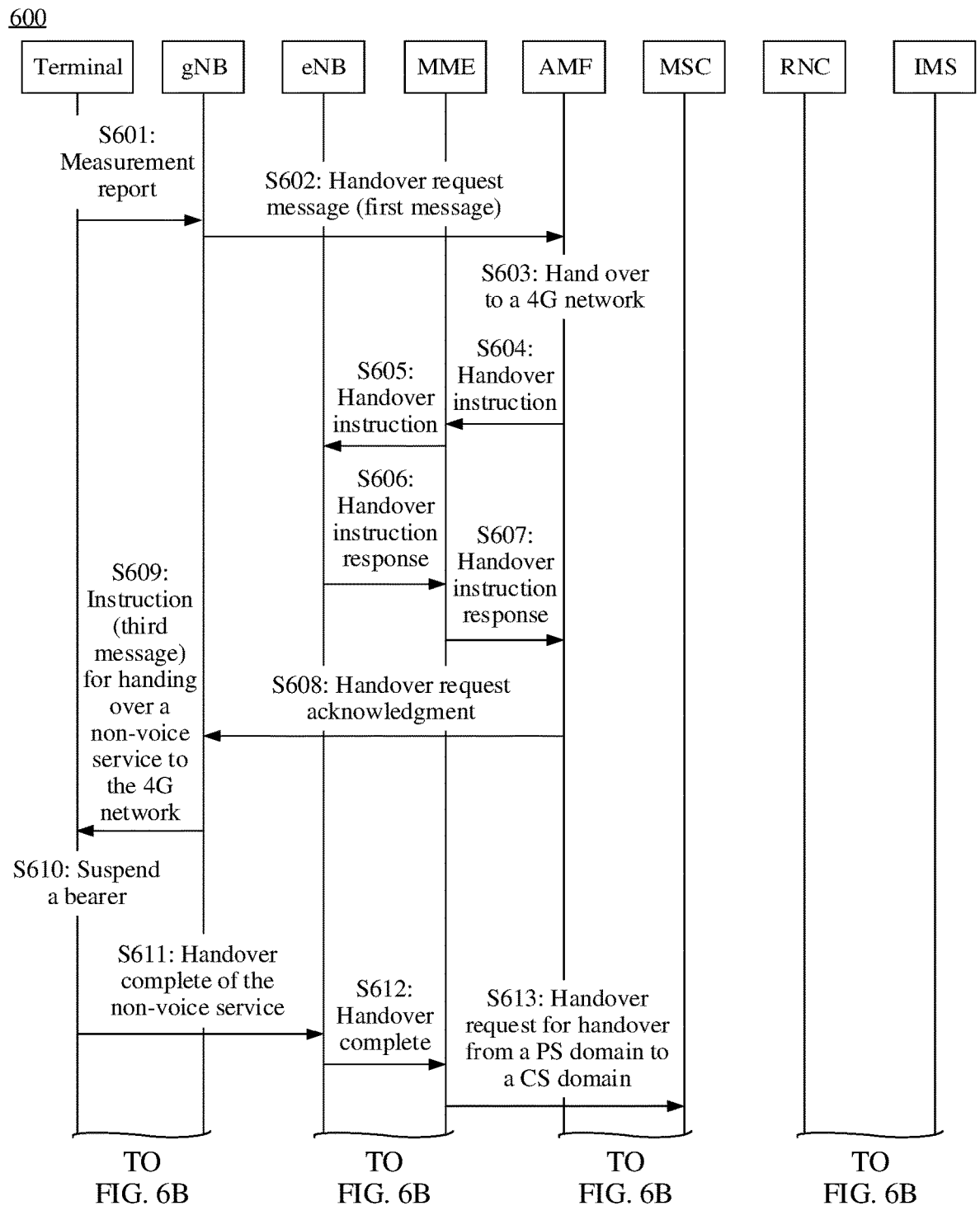
FIG. 6A and FIG. 6B are a schematic interaction diagram of a communication method according to still another embodiment of this application.
Figure 6B:
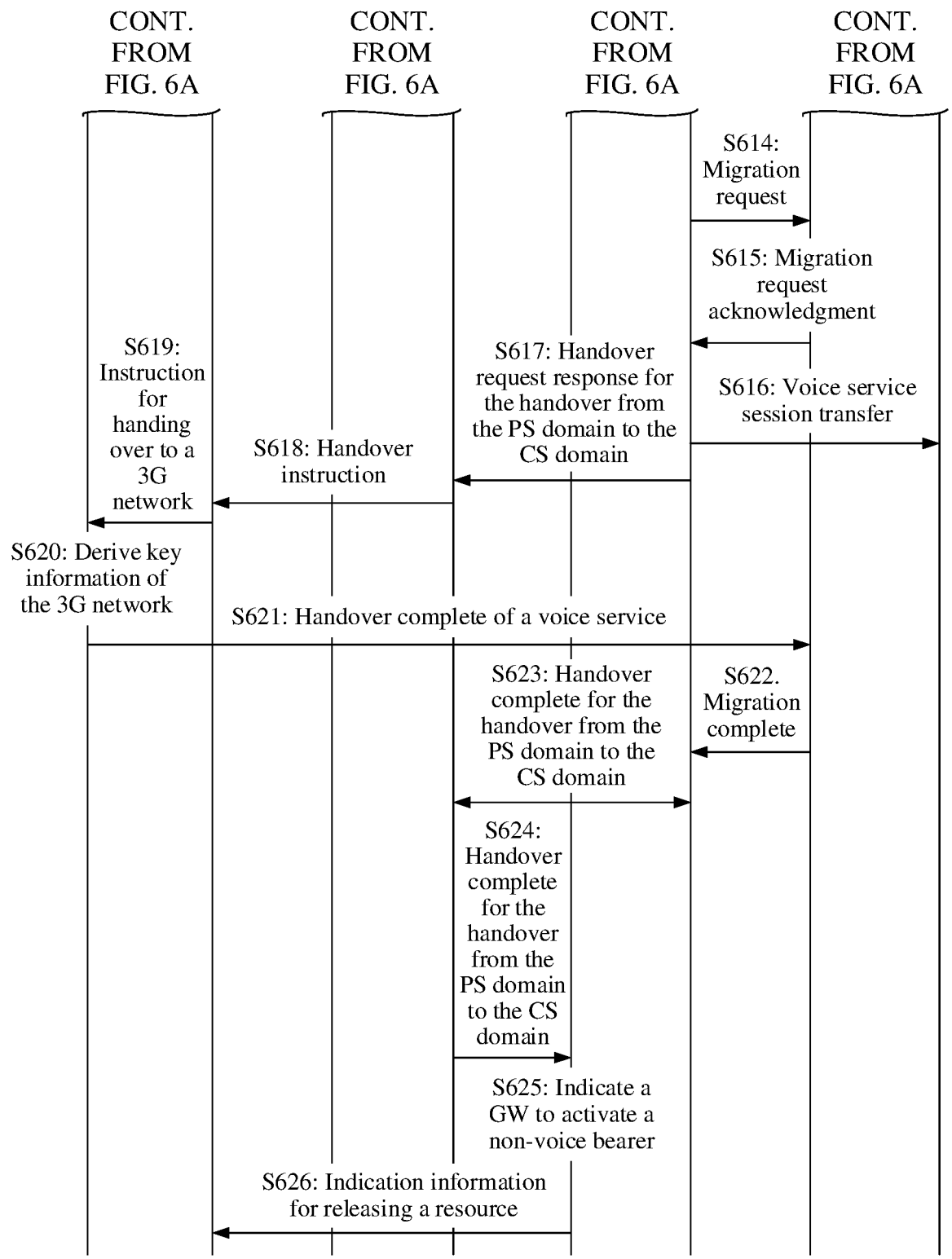

Referring to FIG. 6A and FIG. 6B, a method in FIG. 6A and FIG. 6B may be applied to the architecture 300. The method in FIG. 6A and FIG. 6B is a communication method for handing over a voice service of a terminal from a bearer in a PS domain of a 5G network to a bearer in CS domain of a 3G network when the terminal does not support handover of the voice service from the 5G network to the 3G network. The method in FIG. 6A and FIG. 6B includes the following steps.

S601: The terminal sends a measurement report to a gNB.

S602: The gNB determines, based on a factor such as the measurement report or current load, to initiate, to an AMF entity, a handover request message for handing over the voice service to a 3G CS domain.

It should be understood that in this embodiment of this application, the handover request message sent by the gNB to the AMF entity may be the first message in the method 400.

S603: Because the terminal does not support handover of the voice service from the 5G network to the 3G network, the AMF entity determines to hand over a non-voice service or a non-GBR bearer to a 4G network, and the AMF entity derives key information.

It should be noted that in this embodiment of this application, the AMF entity may directly derive key information of the 3G network. Alternatively, the AMF entity may first derive key information of the 4G network, and then derive key information of the 3G network based on the key information of the 4G network.

Optionally, in an example, the AMF entity derives the key information of the 3G network.

A manner in which the AMF entity determines key derivation parameters of the 3G network and derives the key information of the 3G network based on the key derivation parameters of the 3G network and a root key of a network in which the AMF entity is located includes but is not limited to the following manners.

Optionally, in an example, the AMF entity derives the key information of the 3G network based on a first FC, a first downlink non-access stratum count, and the root key of the network in which the AMF entity is located.

Optionally, in an example, the AMF entity derives the key information of the 3G network based on a first FC, a preset value, and the root key of the network in which the AMF entity is located.

It should be noted that the preset value may be a preset value that is configured in advance and maintained by both the terminal and the AMF entity.

Optionally, in an example, the AMF entity derives the key information of the 3G network based on a first FC, a random number, and the root key of the network in which the AMF entity is located.

It should be noted that the random number may be a parameter known to the AMF entity, and the AMF entity sends the parameter to the terminal.

In the foregoing examples, the root key of the network in which the AMF entity is located may be any one of $K_{AMF}$, $K_{SEAF}$, $K_{AUSF}$, and a cipher key CK+an integrity key IK.

For example, in an optional derivation manner, the AMF entity derives the key information of the 3G network based on the root key and a derivation parameter. The key information of the 3G network includes the cipher key CK and the integrity key IK. The derivation parameter may be one of the first downlink non-access stratum count, the random number, or the preset value, that is, $K_{AMF} \to K_{ASME} \to CS$ domain CK+IK.

For example, in an optional derivation manner, the AMF entity directly uses the root key CK+IK.

Optionally, in an example, the AMF entity derives the key information of the 4G network and the key information of the 3G network.

A manner in which the AMF entity determines key derivation parameters of the 4G network and derives the key information of the 4G network based on the key derivation parameters of the 4G network and the root key of the network in which the AMF entity is located includes but is not limited to the following manners.

For example, the AMF entity derives the key information of the 4G network based on a first FC, a second downlink non-access stratum count, and the root key of the network in which the AMF entity is located.

For example, the AMF entity derives the key information of the 4G network based on a second FC, a second downlink non-access stratum count, and the root key of the network in which the AMF entity is located.

For example, the AMF entity derives the key information of the 4G network based on a second FC, a preset value, and the root key of the network in which the AMF entity is located.

For example, the AMF entity derives the key information of the 4G network based on a second FC, a random number, and the root key of the network in which the AMF entity is located.

The root key of the network in which the AMF entity is located is any one of $K_{AMF}$, $K_{SEAF}$, $K_{AUSF}$, and a cipher key CK+an integrity key IK. Optionally, in an example, the AMF entity derives the key information of the 3G network based on the derived key information of the 4G network.

For example, the AMF entity derives the key information of the 3G network based on the key information of the 4G network, a first FC, and a second downlink non-access stratum count.

For example, the AMF entity derives the key information of the 3G network based on the key information of the 4G network, a second FC, and a second downlink non-access stratum count.

For example, the AMF entity derives the key information of the 3G network based on the key information of the 4G network, a second FC, and a preset value.

It should be understood that the preset value may be a preset value that is configured in advance and maintained by both the terminal and the AMF entity.

For example, the AMF entity derives the key information of the 3G network based on the key information of the 4G network, a second FC, and a random number.

Optionally, in an example, the AMF entity derives the key information of the 3G network based on the derived key information of the 4G network.

For example, the AMF entity derives the key information of the 3G network based on the key information of the 4G network, a third FC, and a second downlink non-access stratum count.

For example, the AMF entity derives the key information of the 3G network based on the key information of the 4G network, a third FC, and a preset value.

For example, the AMF entity derives the key information of the 3G network based on the key information of the 4G network, a third FC, and a random number.

It should be noted that the key derivation parameters used to derive the key information of the 3G network based on the key information of the 4G network may be the same as the key derivation parameters used to derive the key information of the 3G network, or may be different from the key derivation parameters used to derive the key information of the 3G network. The key derivation parameters include parameters such as the first FC, the second FC, the first downlink non-access stratum value, the second downlink non-access stratum value, the preset value, and the random number. It should be noted that, in the implementations of this application, the key derivation parameters used to derive the key information are not limited to the key derivation parameters of the 4G network or the 3G network in this application. Alternatively, key derivation may be performed based on another parameter in combination with the derivation parameters in this application. Alternatively, key derivation may be performed based on some of the key derivation parameters that are used to derive the 4G network or the 3G network and that are proposed in this application.

It should be understood that the random number may be a parameter known to the AMF entity, and the AMF entity sends the parameter to the terminal.

Optionally, in an example, the AMF entity derives the key information of the 4G network, for example, $K_{ASME}$.

It should be understood that the foregoing examples are provided for description, and do not limit this embodiment of this application.

S604: Because the terminal does not support handover of the voice service from the 5G network to the 3G network, the AMF entity sends a handover instruction to an MME entity, where the handover instruction instructs handover of the non-voice service of the terminal from the bearer in the PS domain to the 4G network.

S605: The MME entity sends the handover instruction to a base station eNB of the 4G network, where the instruction is used to indicates the eNB to establish a default RB or a bearer with QCI=9.

S606: The base station eNB of the 4G network sends a handover instruction response to the MME entity, where the handover instruction response indicates that the eNB prepares a target eNB to source eNB container.

S607: The MME entity sends the handover instruction response to the AMF entity.

S608: The AMF entity sends a handover request acknowledgment message to the gNB of the 5G network, where the handover request acknowledgment message includes information for indicating to hand over the non-voice service or the non-GBR bearer from the PS domain to the 4G network.

S609: The gNB of the 5G network sends a handover instruction to the terminal, where the handover instruction instructs handover of the voice service from the PS domain to the 4G network.

S610: After receiving the instruction for handing over the non-voice service from the PS domain to the 4G network, the terminal determines to suspend a bearer of the voice service, suspend a GBR bearer, or suspend a bearer with QCI=1.

It should be noted that in this embodiment of this application, the terminal receives a third message sent by the base station gNB of the 5G network. For example, the terminal receives the handover instruction sent by the base station gNB of the 5G network. When the third message is the information for indicating the terminal to hand over the non-voice service to the 4G network, the terminal determines, based on the third message, to suspend the bearer of the voice service or suspend the bearer with QCI=1.

S611: The terminal sends a handover complete message of the non-voice service to the base station eNB of the 4G network.

S612: The MME entity sends, to the MSC entity, the handover complete message for handing over the non-voice service from the PS domain to the 4G network.

Optionally, after receiving a request sent by the eNB for handing over the voice service from the PS domain to the CS domain of the 3G network, the MME initiates S612.

Optionally, after receiving the handover complete message sent by the eNB, the MME initiates S612.

S613: The MME entity sends, to the MSC entity, a handover request message for handing over the voice service from the bearer in the PS domain to the bearer in the CS domain, where the handover request message may include the key information of the 3G network derived by the AMF entity.

Optionally, the handover request message may be generated by the AMF entity.

Optionally, the MME extracts the cipher key and the integrity protection key of the 3G network from the key information sent by the AMF entity.

S614: The MSC entity sends a migration request message of the voice service to an RNC, where the migration request message includes the key information of the 3G network derived by the AMF entity.

S615: The RNC sends a migration request acknowledgment message to the MSC entity, where the migration request acknowledgment message includes a radio resource configuration parameter allocated by the RNC to the terminal.

S616: The MSC entity initiates voice session transfer information to an IMS entity, and the IMS entity updates a voice session and a user plane bearer based on the message.

S617: The MSC entity sends, to the MME entity, a handover request response for handing over the voice service from the PS domain to the CS domain.

S618: The MME entity sends a handover instruction to the gNB, where the handover instruction includes key derivation parameters determined by the AMF entity.

S619: The gNB sends, to the terminal, the handover instruction for handing over the voice service from the PS domain of the 5G network to the bearer in the CS domain of the 3G network, where the handover instruction includes the key derivation parameters used to derive the key information of the 3G network, and the key derivation parameters are determined by the AMF entity.

S620: The terminal receives the handover instruction including the key derivation parameters, and derives the key information of the 3G network based on the key derivation parameters and a root key of the 5G network.

S621: The terminal accesses the 3G network, and sends a handover complete message to the RNC. The message indicates that the terminal has completed handover of the voice service from the bearer in the PS domain to the bearer in the CS domain.

S622: The RNC sends a migration complete message to the MSC entity, to notify the MSC entity that the terminal has completed handover of the voice service from the bearer in the PS domain to the bearer in the CS domain.

S623: The MSC entity sends, to the MME entity, the handover complete message for handing over the voice service from the bearer in the PS domain to the bearer in the CS domain.

S624: The MME entity sends the handover complete message to the AMF entity.

S625: The AMF entity receives the handover complete message sent by the MME entity.

S626: The AMF entity sends, to the base station gNB of the 5G network, indication information for releasing a resource.

Optionally, the AMF entity indicates the SMF to release or suspend a PDN session of a non-voice bearer or of a non-GBR.

Optionally, the AMF entity indicates the SMF to release or suspend PDN sessions of all bearers.

It should be noted that the method 600 may be the communication method for handing over the voice service of the terminal from the bearer in the PS domain of the 5G network to the bearer in the CS domain of the 3G network when the terminal does not support handover of the voice service from the 5G network to the 3G network.

FIG. 4 to FIG. 6B describe the communication methods used in a 5G communications system and used for handing over the voice service from the bearer in the PS domain of the 5G network to the bearer in the CS domain of the 3G network to maintain continuity of the voice service after the terminal performing the voice service moves out of coverage of the 5G network.

An embodiment of this application further provides a communication method for fast fallback. In the communication method, after a voice service is handed from a bearer in a PS domain to a bearer in a CS domain, when a call of the voice service ends in a 3G network, a terminal rapidly falls back to a proper network, and restores the service of the bearer that is in the PS domain and suspended during voice handover.

Optionally, in an example, after the call of the voice service of the terminal ends in the 3G network, a core network device notifies an RNC, and the RNC indicates UE.

Step 1: An AMF entity or an MME entity sends a handover request message to an MSC entity. The handover request message includes handover information indicating that the handover is from an NR node or the MME entity. It should be understood that in this embodiment of this application, this step is optional.

Step 2: The MSC entity sends the handover information to an RNC. The information is used to indicate the handover from the NR node or the MME entity to the RNC. The MSC entity may determine, based on a type of a source node in the handover request message, whether the source node is an MME entity or an NR node.

Step 3: When Iu is released, the MSC entity indicates to the RNC that the terminal is handed over from the NR node or the MME entity. The RNC determines to release a connection of the terminal on the RNC.

For example, connection release information is sent to the terminal to indicate frequency information of LTE or NR. After receiving the information, the terminal first measures the indicated ARFCN of a radio access system, and performs a cell reselection process. The terminal first measures the indicated ARFCN, and then reselects to a cell having an ARFCN that meets an R criteria.

The R criterion means that $R_s$ of a serving cell and $R_t$ of a target cell respectively meet: $R_s = Q_{meas,s} + QH_{yst}$ and $R_t = Q_{meas,t} - Q_{offset}$. $Q_{meas}$ is an RSRP value of a measured cell, and $Q_{offset}$ defines an offset value of the target cell. For inter-frequency cells having a same priority, two parts are included: a cell-based offset value and a frequency-based offset value. If $R_t$ is always greater than $R_s$ within a time $T_{reselection}$ (where $T_{reselection}$ of an intra-frequency cell may be different from that of the inter-frequency cell), the terminal reselects to a target cell.

Optionally, in an example, the AMF entity or the MME entity sends configuration information to the terminal. The configuration information includes information indicating a network to which the terminal preferentially falls back when the call of the voice service ends in the CS domain.

It should be understood that the configuration information may be information configured before the voice service is handed over, and is used to indicate the terminal to preferentially fall back to NR or LTE after the terminal is handed over from NR or LTE to the 3G network and an air interface connection is released.

For example, when preferentially falling back to NR, the terminal first measures an NR-ARFCN, and reselects to an NR cell that meets the R criteria. If no suitable NR cell is available, the terminal reselects to a suitable LTE cell.

For example, when preferentially falling back to LTE, the terminal first measures an LTE-ARFCN, and reselects to an LTE cell that meets the R criteria. If no suitable LTE cell is available, the terminal reselects to a suitable NR cell.

It should be noted that the communication method for fast fallback may be combined with the communication methods that are used for handing over the voice service from the bearer in the PS domain of the 5G network to the bearer in the CS domain of the 3G network and that are described in FIG. 4 to FIG. 6B. This is not limited in the embodiments of this application.

It should be understood that sequence numbers of the foregoing processes do not mean execution sequences in various embodiments of this application. The execution sequences of the processes should be determined based on functions and internal logic of the processes, and should not constitute any limitation on the implementation processes of the embodiments of this application.

It may be understood that, in the foregoing embodiments, steps or operations implemented by the terminal may alternatively be implemented by a component (for example, a chip or a circuit) that may be used in the terminal, and steps or operations implemented by the access network device may alternatively be implemented by a component (for example, a chip or a circuit) that may be used in the access network device.

The foregoing describes in detail the communication methods for handing over the voice service from the bearer in the PS domain of the 5G network to the bearer in the CS domain of the 3G network in different scenarios according to the embodiments of this application. The following describes a communications apparatus according to the embodiments of this application. It should be understood that the communications apparatus in the embodiments of this application may perform the various communication methods in the foregoing embodiments of this application. In other words, for specific working processes of the following products, refer to corresponding processes in the foregoing method embodiments.

Figure 7:
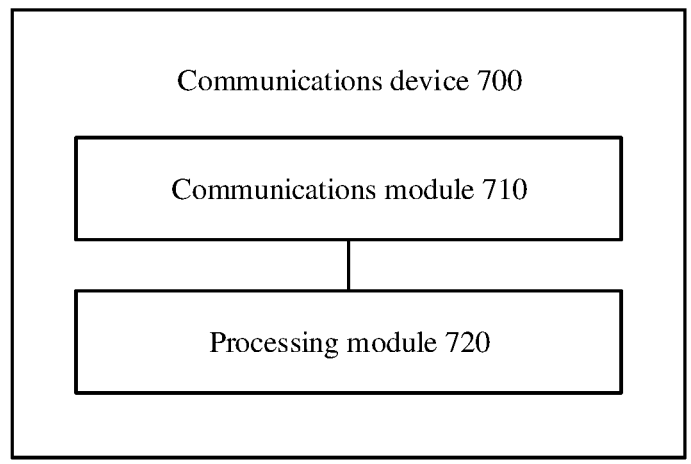
FIG. 7 is a schematic block diagram of a communications apparatus according to an embodiment of this application.

FIG. 7 is a schematic structural diagram of a communications apparatus according to an embodiment of this application. The communications apparatus 700 in FIG. 7 may correspondingly implement steps or operations performed by the AMF entity in the foregoing descriptions, and may include a communications module 710, configured to receive a first message, where the first message includes information for indicating to hand over a voice service of a terminal from a packet switched (PS) domain to a circuit switched (CS) domain, the first message further includes identification information of a target device, and the target device is an access network device in a 3G network and/or a 4G network, and a processing module 720, configured to derive key information of a network in which the target device is located.

In this embodiment of this application, the communications apparatus determines, based on an identifier of the target device in a handover request message of the voice service, the network to which the voice service is to be handed over, to derive the key information of the network in which the target device is located, ensuring that the voice service is handed over from a bearer in the PS domain to the network in which the target device is located, ensuring continuity of the voice service, and improving user experience.

Optionally, the processing module 720 is specifically configured to determine key derivation parameters of the 3G network, and derive the key information of the 3G network based on the key derivation parameters of the 3G network and a root key.

Optionally, the processing module 720 is specifically configured to derive the key information of the 3G network based on a first FC, a first downlink non-access stratum count, and a root key, derive the key information of the 3G network based on a first FC, a preset value, and a root key, or derive the key information of the 3G network based on a first FC, a random number, and a root key.

Optionally, the processing module 720 is specifically configured to determine key derivation parameters of the 4G network, derive the key information of the 4G network based on the key derivation parameters of the 4G network and a root key, and derive the key information of the 3G network based on the key information of the 4G network.

Optionally, the processing module 720 is specifically configured to determine key derivation parameters of the 4G network, and derive the key information of the 4G network based on the key derivation parameters of the 4G network and a root key.

Optionally, the processing module 720 is specifically configured to derive the key information of the 4G network based on a first FC, a second downlink non-access stratum count, and a root key, derive the key information of the 4G network based on a second FC, a second downlink non-access stratum count, and a root key, derive the key information of the 4G network based on a second FC, a preset value, and a root key, or derive the key information of the 4G network based on a second FC, a random number, and a root key.

Optionally, the processing module 720 is specifically configured to derive the key information of the 3G network based on the key information of the 4G network, a first FC, and a second downlink non-access stratum count, derive the key information of the 3G network based on the key information of the 4G network, a second FC, and a second downlink non-access stratum count, derive the key information of the 3G network based on the key information of the 4G network, a second FC, and a preset value, or derive the key information of the 3G network based on the key information of the 4G network, a second FC, and a random number.

Optionally, the root key is any one of $K_{AMF}$, $K_{SEAF}$, $K_{AUSF}$, and a cipher key CK+an integrity key IK.

Optionally, the communications module 710 is further configured to send the key information of the 3G network to a mobility management entity (MME), send the key information of the 3G network and the key information of the 4G network to a mobility management entity (MME), or send the key information of the 4G network to a mobility management entity (MME).

Optionally, the communications module 710 is further configured to receive a second message, where the second message includes information indicating that handover of the voice service from the PS domain to the CS domain is complete.

When the communications module 710 receives the second message, the processing module 720 is further configured to determine, based on the second message, to suspend or release a PDN session of a non-voice service.

Optionally, the communications module 710 is further configured to send configuration information, where the configuration information includes information indicating a network to which the terminal preferentially falls back when a call of the voice service ends in the CS domain.

Optionally, the communications apparatus 700 may be a core network device in a 5G communications system, and the communications apparatus may be configured to hand over the voice service of the terminal from a bearer in the PS domain to a bearer in the CS domain.

It may be understood that, for implementations, interaction, and the like of the modules in the communications apparatus 700 in this embodiment of this application, refer to related descriptions in the method embodiments.

Figure 8:
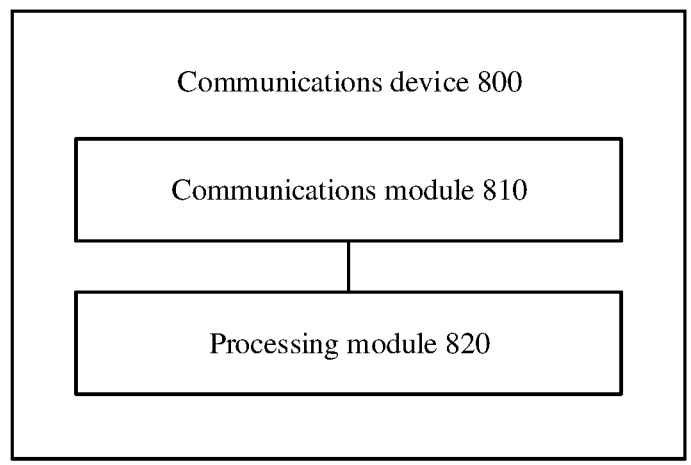
FIG. 8 is a schematic block diagram of a communications apparatus according to another embodiment of this application.

FIG. 8 is a schematic structural diagram of a communications apparatus according to an embodiment of this application. The communications apparatus 800 in FIG. 8 may correspond to the terminal in the foregoing embodiments, and may include a communications module 810, configured to receive a third message, and if the third message includes information for indicating to hand over a voice service from a packet switched (PS) domain to a circuit switched (CS) domain, determine, based on the third message, to suspend or release a PDN session of a non-voice service, or if the third message includes information for indicating to hand over a non-voice service to a 4G network, determine, based on the third message, to suspend a bearer of a voice service or suspend a bearer with QCI=1, and a processing module 820, configured to determine to derive key information of a network in which a target device is located, where the target device is an access network device in a 3G network and/or the 4G network.

In this embodiment of this application, the communications apparatus processes the voice service or the non-voice service based on a received handover request message, to hand over the voice service from a bearer in the PS domain to a bearer in the CS domain, ensuring continuity of the voice service, and improving user experience.

Optionally, the third message further includes key derivation parameters, and the key derivation parameters are determined by an access and mobility management function AMF entity.

Optionally, the processing module 820 is further configured to derive the key information of the 3G network based on the key derivation parameters of the 3G network and a root key, or derive the key information of the 4G network based on the key derivation parameters of the 4G network and a root key.

Optionally, the processing module 820 is specifically configured to derive the key information of the 3G network based on a first FC, a first downlink non-access stratum count, and a root key, derive the key information of the 3G network based on a first FC, a preset value, and a root key, or derive the key information of the 3G network based on a first FC, a random number, and a root key.

Optionally, the processing module 820 is specifically configured to derive the key information of the 4G network based on a first FC, a second downlink non-access stratum count, and a root key, derive the key information of the 4G network based on a second FC, a second downlink non-access stratum count, and a root key, derive the key information of the 4G network based on a second FC, a preset value, and a root key, or derive the key information of the 4G network based on a second FC, a random number, and a root key.

Optionally, the root key is any one of $K_{AMF}$, $K_{SEAF}$, $K_{AUSF}$, and a cipher key CK+an integrity key IK.

Optionally, the processing module 820 is further configured to derive the key information of the 3G network based on the key information of the 4G network.

Optionally, the processing module 820 is specifically configured to derive the key information of the 3G network based on the key information of the 4G network, a first FC, and a second downlink non-access stratum count, derive the key information of the 3G network based on the key information of the 4G network, a second FC, and a second downlink non-access stratum count, derive the key information of the 3G network based on the key information of the 4G network, a second FC, and a preset value, or derive the key information of the 3G network based on the key information of the 4G network, a second FC, and a random number.

Optionally, the communications module 810 is further configured to receive configuration information, where the configuration information includes information indicating a network to which the terminal preferentially falls back when a call of the voice service ends in the CS domain.

It may be understood that, for implementations, interaction, and the like of the modules in the communications apparatus 800 in this embodiment of this application, refer to related descriptions in the method embodiments.

Figure 9:
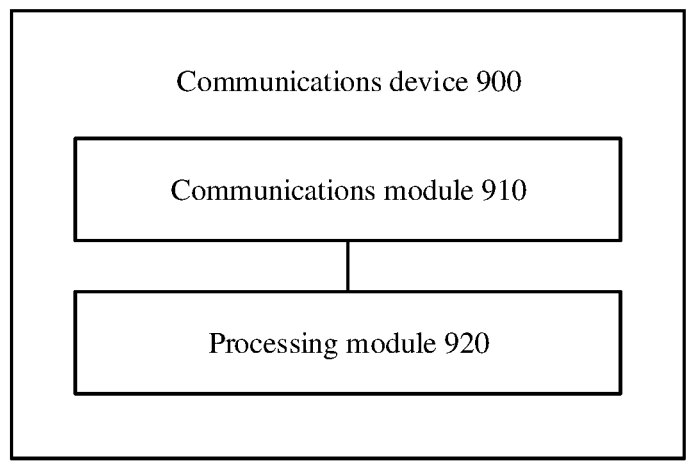
FIG. 9 is a schematic block diagram of a communications apparatus according to still another embodiment of this application.

FIG. 9 is a schematic structural diagram of a communications apparatus according to an embodiment of this application. The communications apparatus 900 in FIG. 9 may correspond to the base station in the foregoing 5G communications system, for example, the gNB, and may include a processing module, configured to generate a third message, and if the third message includes information for indicating to hand over the voice service from the PS domain to a CS domain, indicate a terminal to suspend or release a PDN session of a non-voice service, or if the third message includes information for indicating to hand over a non-voice service from the PS domain to a 4G network, indicate a terminal to suspend a bearer of a voice service or suspend a bearer with QCI=1, and a communications module, configured to send the third message to the terminal.

In the technical solution of this embodiment of this application, the communications apparatus generates the third message, and sends the third message to the terminal. The terminal indicates, according to the indication information included in the third message, to suspend the voice service or the non-voice service, to ensure that the voice service is handed over from a bearer in the PS domain to a bearer in the CS domain, ensuring continuity of the voice service, and improving user experience.

Optionally, the third message includes key derivation parameters of a network in which the target device is located, and the key derivation parameters are determined by the AMF entity.

It may be understood that, for implementations, interaction, and the like of the modules in the communications apparatus 900 in this embodiment of this application, refer to related descriptions in the method embodiments.

It may be understood that all modules in the communications apparatus 700, the communications apparatus 800, and the communications apparatus 900 may be separately disposed, or may be integrated together. The foregoing modules may also be referred to as components or circuits.

It may be understood that the communications apparatus 700, the communications apparatus 800, or the communications apparatus 900 may be implemented by using at least one processor, or may be implemented by using at least one processor and at least one memory, or may be implemented by using at least one processor and at least one transceiver, or may be implemented by using at least one processor, at least one transceiver, and at least one memory. The processor, the transceiver, and the memory may be disposed separately, or may be integrated together.

Figure 10:
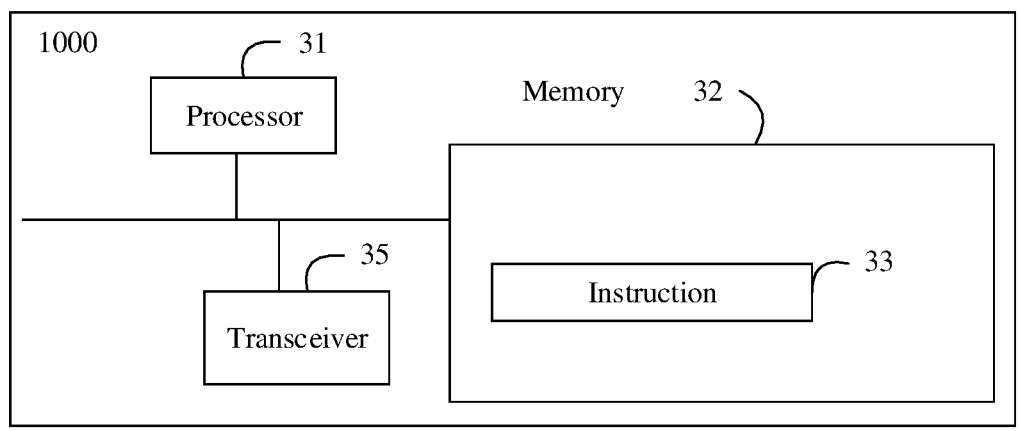
FIG. 10 is a schematic structural diagram of a communications apparatus according to yet another embodiment of this application.

FIG. 10 is a schematic structural diagram of a communications apparatus. The communications apparatus 1000 may be configured to implement a method that corresponds to the AMF entity and is described in the foregoing method embodiments, or may be configured to implement a method that corresponds to the terminal and is described in the foregoing method embodiments, or may be configured to implement a method that corresponds to the access network device such as the gNB and is described in the foregoing method embodiments. For details, refer to the descriptions in the foregoing method embodiments.

The communications apparatus 1000 may include one or more processors 31. The processor 31 may also be referred to as a processing unit, and may implement a specific control function. The processor 31 may be a general-purpose processor, a dedicated processor, or the like.

In an optional design, a memory 32 may store an instruction 33. The instruction 33 may be run by the processor 31, so that the communications apparatus 1000 performs the method that corresponds to the AMF entity, the terminal, or the access network device and that is described in the foregoing method embodiments.

In another possible design, the communications apparatus 1000 may include a circuit. The circuit may implement the sending, receiving, or communication function in the foregoing method embodiments.

Optionally, the communications apparatus 1000 may include one or more memories 32. The memory stores an instruction 33 or intermediate data. The instruction 33 may be run on the processor 31, so that the communications apparatus 1000 performs the method that is performed by the AMF entity, the terminal, or the access network device and described in the foregoing embodiments. Optionally, the memory may further store other related data. Optionally, the processor may also store an instruction and/or data. The processor and the memory may be disposed separately, or may be integrated together.

Optionally, the communications apparatus 1000 may further include a transceiver 35. The processor 31 may be referred to as a processing unit. The transceiver 35 may be referred to as a transceiver unit, a transceiver machine, a transceiver circuit, a transceiver, or the like, and is configured to implement a transceiver function of the communications apparatus.

In a design, the communications apparatus (for example, an integrated circuit, a wireless device, a circuit module, a network device, or a terminal device) may include a processor and a transceiver. If the communications apparatus is configured to implement steps or operations performed by the AMF entity in the embodiments corresponding to FIG. 4 to FIG. 6B, the transceiver 35 may receive a first message, where the first message includes information for indicating to hand over a voice service of a terminal from a packet switched (PS) domain to a circuit switched (CS) domain, the first message further includes identification information of a target device, and the target device is an access network device in a 3G network and/or a 4G network, and the processor 31 is configured to derive key information of a network in which the target device is located.

Optionally, the processor 31 is specifically configured to determine key derivation parameters of the 3G network, and derive the key information of the 3G network based on the key derivation parameters of the 3G network and a root key.

Optionally, the processor 31 is further configured to derive the key information of the 3G network based on a first FC, a first downlink non-access stratum count, and a root key, derive the key information of the 3G network based on a first FC, a preset value, and a root key, or derive the key information of the 3G network based on a first FC, a random number, and a root key.

Optionally, the processor 31 is further configured to determine key derivation parameters of the 4G network, derive the key information of the 4G network based on the key derivation parameters of the 4G network and a root key, and derive the key information of the 3G network based on the key information of the 4G network.

Optionally, the processor 31 is further configured to determine key derivation parameters of the 4G network, and derive the key information of the 4G network based on the key derivation parameters of the 4G network and a root key.

Optionally, the processor 31 is further configured to derive the key information of the 4G network based on a first FC, a second downlink non-access stratum count, and a root key, derive the key information of the 4G network based on a second FC, a second downlink non-access stratum count, and a root key, derive the key information of the 4G network based on a second FC, a preset value, and a root key, or derive the key information of the 4G network based on a second FC, a random number, and a root key.

Optionally, the processor 31 is further configured to derive the key information of the 3G network based on the key information of the 4G network.

For example, the processor 31 is configured to derive the key information of the 3G network based on the key information of the 4G network, a first FC, and a second downlink non-access stratum count, derive the key information of the 3G network based on the key information of the 4G network, a second FC, and a second downlink non-access stratum count, derive the key information of the 3G network based on the key information of the 4G network, a second FC, and a preset value, or derive the key information of the 3G network based on the key information of the 4G network, a second FC, and a random number.

Optionally, the root key is any one of $K_{AMF}$, $K_{SEAF}$, $K_{AUSF}$, and a cipher key CK+an integrity key IK.

Optionally, the transceiver 35 is further configured to send the key information of the 3G network to a mobility management entity (MME), send the key information of the 3G network and the key information of the 4G network to a mobility management entity (MME), or send the key information of the 4G network to a mobility management entity (MME).

Optionally, the transceiver 35 is further configured to receive a second message, where the second message includes information indicating that handover of the voice service from the PS domain to the CS domain is complete.

When the transceiver 35 receives the second message, the processor 31 is configured to determine, based on the second message, to suspend or release a PDN session of a non-voice service.

Optionally, the transceiver 35 is further configured to send configuration information, where the configuration information includes information indicating a network to which the terminal preferentially falls back when a call of the voice service ends in the CS domain.

In a design, the communications apparatus (for example, an integrated circuit, a wireless device, a circuit module, a network device, or a terminal device) may include a processor and a transceiver. If the communications apparatus is configured to implement steps or operations performed by the terminal in the embodiment corresponding to FIG. 5A and FIG. 5B or FIG. 6A and FIG. 6B, the transceiver 35 may receive a third message, and if the third message includes information for indicating to hand over a voice service from a packet switched (PS) domain to a circuit switched (CS) domain, determine, based on the third message, to suspend or release a PDN session of a non-voice service, or if the third message includes information for indicating to hand over a non-voice service to a 4G network, determine, based on the third message, to suspend a bearer of a voice service or suspend a bearer with QCI=1, and the processor 31 is configured to derive key information of a network in which a target device is located, where the target device is an access network device in a 3G network and/or the 4G network.

Optionally, the processor 31 is further configured to derive the key information of the 3G network based on key derivation parameters of the 3G network and a root key, or derive the key information of the 4G network based on key derivation parameters of the 4G network and a root key.

Optionally, the processor 31 is specifically configured to derive the key information of the 3G network based on a first FC, a first downlink non-access stratum count, and a root key, derive the key information of the 3G network based on a first FC, a preset value, and a root key, or derive the key information of the 3G network based on a first FC, a random number, and a root key.

Optionally, the processor 31 is specifically configured to derive the key information of the 4G network based on a first FC, a second downlink non-access stratum count, and a root key, derive the key information of the 4G network based on a second FC, a second downlink non-access stratum count, and a root key, derive the key information of the 4G network based on a second FC, a preset value, and a root key, or derive the key information of the 4G network based on a second FC, a random number, and a root key.

Optionally, the root key is any one of $K_{AMF}$, $K_{SEAF}$, $K_{AUSF}$, and a cipher key CK+an integrity key IK.

Optionally, the processor 31 is further configured to derive the key information of the 3G network based on the key information of the 4G network.

Optionally, the processor 31 is specifically configured to derive the key information of the 3G network based on the key information of the 4G network, a first FC, and a second downlink non-access stratum count, derive the key information of the 3G network based on the key information of the 4G network, a second FC, and a second downlink non-access stratum count, derive the key information of the 3G network based on the key information of the 4G network, a second FC, and a preset value, or derive the key information of the 3G network based on the key information of the 4G network, a second FC, and a random number.

Optionally, the transceiver 35 is further configured to receive configuration information, where the configuration information includes information indicating a network to which the terminal preferentially falls back when a call of the voice service ends in the CS domain.

In a design, the communications apparatus (for example, an integrated circuit, a wireless device, a circuit module, a network device, or a terminal device) may include a processor and a transceiver. If the communications apparatus is configured to implement the access network device in the embodiment corresponding to FIG. 4 or implement steps or operations performed by the gNB in the embodiment corresponding to FIG. 5A and FIG. 5B and in the embodiment corresponding to FIG. 6A and FIG. 6B, the processor 31 may generate a third message, and if the third message includes information for indicating to hand over the voice service from the PS domain to a CS domain, indicate a terminal to suspend or release a PDN session of a non-voice service, or if the third message includes information for indicating to hand over a non-voice service from the PS domain to a 4G network, indicate a terminal to suspend a bearer of a voice service or suspend a bearer with QCI=1, and the transceiver 35 is configured to send the third message to the terminal.

Optionally, the third message includes key derivation parameters of a network in which the target device is located, and the key derivation parameters are determined by the AMF entity.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may also be manufactured by using various 1C technologies, for example, a complementary metal oxide semiconductor (CMOS), an N-channel metal-oxide-semiconductor (NMOS), a P-channel metal-oxide-semiconductor (PMOS), a bipolar junction transistor (bipolar junction transistor, BJT), a bipolar CMOS (BiCMOS), silicon germanium (SiGe), and gallium arsenide (GaAs).

In the descriptions of the foregoing embodiments, the communications apparatus 1000 is described by using the AMF entity, the access network device, or the terminal as an example, but a scope of the communications apparatus described in this application is not limited to the AMF entity, the access network device, or the terminal, and a structure of the communications apparatus may not be limited by FIG. 10. The communications apparatus may be an independent device or may be a part of a relatively large device. For example, the device may be (1) an independent integrated circuit (IC), a chip, or a chip system or subsystem, (2) a set having one or more ICs, where optionally, the IC set may also include a storage component configured to store data and/or an instruction, (3) an ASIC, for example, a modem (MSM), (4) a module that can be embedded in another device, (5) a receiver, a terminal, a cellular phone, a wireless device, a handheld phone, a mobile unit, a network device, or the like, or (6) another device or the like.

A person of ordinary skill in the art may be aware that, in combination with the units and algorithm steps in the examples described in the embodiments disclosed in this specification, this application may be implemented by using electronic hardware or a combination of electronic hardware and computer software. Whether the functions are performed by using hardware or software depends on particular applications and design constraint conditions of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the modules or units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer program instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by an access and mobility management function (AMF) entity, a first message from a first access network device, wherein the first message comprises information indicating a handover of a voice service of a terminal from a packet switched (PS) domain to a circuit switched (CS) domain, the first message further comprises identification information of a target device, and the target device is a radio network controller (RNC) in a third generation (3G) network; and
   sending, by the AMF entity through a mobility management entity (MME), a handover request message to a mobile switching center (MSC) entity, wherein the handover request message includes handover information indicating to the RNC that the information indicating the handover of the voice service of the terminal from the PS domain to the CS domain is from a new radio (NR) node.

2. The method according to claim 1, wherein the first access network device is a base station in an NR network.

3. The method according to claim 1, wherein the handover request message further comprises the information indicating the handover of the voice service of the terminal from the PS domain to the CS domain.

4. The method according to claim 1, further comprising:
   receiving, by the AMF entity through the MME, a second message from the MSC entity, wherein the second message comprises information indicating completion of the handover of the voice service from the PS domain to the CS domain; and
   determining, by the AMF entity based on the second message, to suspend or release all packet data network (PDN) sessions.

5. The method according to claim 4, wherein the determining to suspend or release the all PDN sessions comprises:
   indicating, by the AMF entity, to a session management function (SMF) entity to suspend or release the all PDN sessions.

6. The method according to claim 1, further comprising:
   deriving, by the AMF entity, key information of a fourth generation (4G) network; and
   sending the key information of the 4G network to the MME for deriving key information of the 3G network.

7. A method, comprising:
   receiving, by a mobility management entity (MME) from an access and mobility management function (AMF) entity, a handover request message, wherein the handover request message includes handover information indicating to a radio network controller (RNC) that information indicating a handover of a voice service of a terminal from a packet switched (PS) domain to a circuit switched (CS) domain is from a new radio (NR) node; and
   forwarding, by the MME, the handover request message to a mobile switching center (MSC) entity.

8. The method according to claim 7, wherein the handover request message further comprises the information indicating the handover of the voice service of the terminal from the PS domain to the CS domain.

9. The method according to claim 7, further comprising:
   receiving, by the MME, a second message from the MSC entity, wherein the second message comprises information indicating completion of the handover of the voice service from the PS domain to the CS domain; and forwarding, by the MME, the second message to the AMF entity to trigger a procedure of suspending or releasing all packet data network (PDN) sessions.

10. The method according to claim 7, further comprising:
receiving, by the MME, key information of a fourth generation (4G) network from the AMF entity;
deriving, by the MME, key information of a 3G network according to the key information of the 4G network; and
sending, by the MME, the key information of the 3G network to the MSC entity.

11. A system, comprising:
an access and mobility management function (AMF) entity; and
a mobility management entity (MME), wherein the AMF entity is configured to:
  receive a first message from a first access network device, wherein the first message comprises information for indicating to a handover of a voice service of a terminal from a packet switched (PS) domain to a circuit switched (CS) domain, the first message further comprises identification information of a target device, and the target device is a radio network controller (RNC) in a third generation (3G) network, and
  send a handover request message to the MME, wherein the handover request message includes handover information indicating to the RNC that the information indicating the handover the voice service of the terminal from the PS domain to the CS domain is from a new radio (NR) node, and
wherein the MME is configured to:
  receive the handover request message from the AMF entity, and
  forward the handover request message to a mobile switching center (MSC) entity.

12. The system according to claim 11, wherein the first access network device is a base station in an NR network.

13. The system according to claim 11, wherein the handover request message further comprises the information indicating the handover of the voice service of the terminal from the PS domain to the CS domain.

14. The system according to claim 11, wherein the AMF entity is further configured to:
receive, through the MME, a second message from the MSC entity, wherein the second message comprises information indicating completion of the handover of the voice service from the PS domain to the CS domain; and
determine, by the AMF entity based on the second message, to suspend or release all packet data network (PDN) sessions.

15. The system according to claim 14, wherein the AMF entity is configured to:
indicate to a session management function (SMF) entity to suspend or release the all PDN sessions.

16. The system according to claim 14, wherein the MME is further configured to:
receive the second message from the MSC entity, and
forward the second message to the AMF entity.

17. The system according to claim 11, wherein the AMF entity is further configured to:
derive key information of a fourth generation (4G) network, and
send the key information of the 4G network to the MME for deriving the key information of the 3G network.

18. The system according to claim 17, wherein the MME is further configured to:
receive the key information of the 4G network from the AMF entity,
derive the key information of the 3G network according to the key information of the 4G network, and
send the key information of the 3G network to the MSC entity.

19. The system according to claim 11, wherein the AMF entity is further configured to:
before the first message is received by the AMF entity:
  receive, from the terminal, indication that the terminal supports the handover; and
  sending, to the first access network device, notification that the terminal supports the handover.

* * * * *